US008147070B2

(12) United States Patent  
Sakai

(10) Patent No.: US 8,147,070 B2  
(45) Date of Patent: Apr. 3, 2012

(54) PROJECTOR

(75) Inventor: Kenshi Sakai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 685 days.

(21) Appl. No.: 12/335,974

(22) Filed: Dec. 16, 2008

(65) Prior Publication Data

US 2009/0195755 A1 Aug. 6, 2009

(30) Foreign Application Priority Data

Dec. 20, 2007 (JP) ................................. 2007-328375  
Sep. 16, 2008 (JP) ................................. 2008-236105

(51) Int. Cl.  
*G03B 21/00* (2006.01)  
*G03B 21/14* (2006.01)  
*G02F 1/13* (2006.01)  
*H04N 9/31* (2006.01)

(52) U.S. Cl. ................. 353/33; 353/81; 349/8; 348/757

(58) Field of Classification Search ............. 353/30, 353/31, 33, 34, 81; 349/5, 8; 348/744, 750, 348/751, 756, 757  
See application file for complete search history.

(56) References Cited

U.S. PATENT DOCUMENTS

| 6,042,234 | A | * | 3/2000 | Itoh | 353/20 |
| 6,067,128 | A | | 5/2000 | Imai | |
| 6,101,040 | A | * | 8/2000 | Itoh | 359/622 |
| 6,222,674 | B1 | * | 4/2001 | Ohta | 359/618 |
| 7,354,162 | B2 | * | 4/2008 | Akiyama | 353/102 |
| 7,636,200 | B2 | * | 12/2009 | Ishibashi et al. | 359/634 |
| 2003/0025883 | A1 | * | 2/2003 | Yajima | 353/38 |
| 2003/0133078 | A1 | * | 7/2003 | Iechika et al. | 353/24 |
| 2004/0263500 | A1 | * | 12/2004 | Sakata | 345/204 |
| 2005/0174542 | A1 | * | 8/2005 | Kawai et al. | 353/31 |
| 2005/0264763 | A1 | | 12/2005 | Osaka | |
| 2006/0126026 | A1 | * | 6/2006 | Akiyama | 353/34 |
| 2006/0164601 | A1 | * | 7/2006 | Akiyama | 353/33 |
| 2007/0035704 | A1 | * | 2/2007 | Akiyama | 353/102 |
| 2007/0070305 | A1 | * | 3/2007 | Sakata | 353/94 |
| 2007/0091270 | A1 | * | 4/2007 | Akiyama | 353/30 |
| 2007/0206157 | A1 | * | 9/2007 | Iinuma et al. | 353/33 |
| 2007/0206163 | A1 | * | 9/2007 | Kuroda | 353/88 |
| 2007/0252076 | A1 | * | 11/2007 | Nishida et al. | 250/216 |
| 2008/0049191 | A1 | * | 2/2008 | Endo | 353/22 |
| 2008/0165407 | A1 | * | 7/2008 | Ishibashi et al. | 359/238 |
| 2009/0195755 | A1 | * | 8/2009 | Sakai | 353/33 |

FOREIGN PATENT DOCUMENTS

| JP | A-08-254678 | 10/1996 |
| JP | A-10-206815 | 8/1998 |
| JP | A-2004-226814 | 8/2004 |
| JP | A-2005-17772 | 1/2005 |
| JP | A-2005-345604 | 12/2005 |
| JP | A-2007-279332 | 10/2007 |

* cited by examiner

*Primary Examiner* — John Lee  
(74) *Attorney, Agent, or Firm* — Oliff & Berridge, PLC

(57) ABSTRACT

A projector can form images of illumination system on respective optical paths at positions of corresponding liquid crystal display panels with respect to a light emission surface of a cross dichroic prism without relatively inverting the images and without increasing the number of lenses from the number of lenses included in a relay optical path structure in related art. Moreover, the projector can equalize the magnification of the images formed on the respective liquid crystal display panels by controlling relative image-forming conditions of the first and second optical paths in advance. Thus, deterioration of white balance and color unevenness of light projected by the projector can be reduced even when light emission distribution of a light source varies with elapse of time, for example.

20 Claims, 9 Drawing Sheets

PROJECTOR

BACKGROUND OF THE INVENTION

1. Technical Field

The present invention relates to a projector which modulates illumination light by using a light modulation device and projects modulated image light.

2. Description of Related Art

A typical known projector includes a light source which emits approximately white light, an illumination system which equalizes light emitted from the light source and converts the light into polarized light, a color separation and light guide system which separates the light having passed the illumination system and guides the light along optical paths for three color lights in green, blue, and red, three liquid crystal light valves illuminated by the illumination lights in three colors, a cross dichroic prism which combines images received from the three liquid crystal light valves, and a projection lens which enlarges the combined image and projects the enlarged image.

When the relative illuminance distributions of lights applied to the respective liquid crystal light valves are different in the projector having the above structure, deterioration of white balance, color unevenness or the like of the projection image obtained by combination of the lights is caused. For overcoming this problem, a method which equalizes the optical path lengths for separated green light and blue light, and inserts a relay lens on the red optical path to correct the illuminance distributions (for example, see JP-A-2005-345604) has been proposed. Also, such a method has been disclosed which sets the number of times of reflection on the respective optical paths at an odd number or an even number such that the respective optical lengths become substantially equal, thereby making the illuminance distributions relatively and substantially equal to one another (for example, see JP-A-8-254678).

According to the projector disclosed in JP-A-2005-345604, however, lights received by the liquid crystal light valves on the blue and green optical paths and light received by the liquid crystal light valve on the red optical path are inverted in the left-right direction, for example. In this case, the illuminance distributions are difficult to be completely corrected. Thus, when the intensity of illumination varies due to fluctuations in light emission point of the light source, shift of component positions within the projector or for other reasons, color unevenness is produced.

According to the projector disclosed in JP-A-2005-345604, the illuminance decreases by complication of optical paths and increase in the number of times of reflection of light even when the illuminance distributions are relatively equalized.

SUMMARY OF THE INVENTION

Accordingly, it is an object of the invention to provide a projector which includes simplified optical systems capable of preventing decrease in illuminance and relative invert of illuminance distribution.

For achieving the above object, a projector according to a first aspect of the invention includes: a light source which emits light containing a first color light and a second color light; an illumination system which equalizes light emitted from the light source; a color separation and light guide system which separates light emitted from the light source into the first color light and the second color light; a light modulation unit which has a first light modulation device and a second light modulation device illuminated by the first color light and the second color light, respectively, separated by the color separation and light guide system; and a light combining system which combines the first color light and the second color light passing through the first light modulation device and the second light modulation device and received through a plurality of light receiving portions, respectively, to emit the combined light from a light emission portion. The length of a first optical path for directing the first color light traveling from the illumination system through the first light modulation device to the light emission portion of the light combining system is shorter than the length of the second optical path for directing the second color light traveling from the illumination system through the second light modulation device to the light emission portion of the light combining system. The color separation and light guide system has at least one reflection surface. The difference between the number of the reflection surfaces existing on the first optical path and the number of the reflection surfaces existing on the second optical path is an even number. An inverted image of the illumination system is formed at the position of the first light modulation device when the first optical path is replaced with a linear optical path having no reflection surface. An inverted image of the illumination system is formed at the position of the second light modulation device when the second optical path is replaced with a linear optical path having no reflection surface.

According to the projector of the first aspect of the invention, inverted images of the illumination system are formed at the positions of the first and second light modulation devices when the first and second optical paths having different lengths are replaced with linear optical paths having no reflection surface, and the difference between the number of the reflection surfaces existing on the first optical path and the number of the reflection surfaces existing on the second optical path is an even number. Thus, relative inversion of the images of the illumination system produced by the first and second color lights passing through the first and second optical paths can be prevented when the images of the color lights are formed on the first and second light modulation devices and combined by the light combining system. That is, the images of the illumination system produced by the first and second color lights on the first and second optical paths become a common image in the up-down and left-right directions after emission from the light emission portion of the light combining system even when the second optical path is longer than the first optical path.

The image of the illumination system refers to a real image of the illumination system actually or virtually produced at the positions of the light modulation devices or conjugate positions downstream from the positions. More specifically, the image is an inverted image, an up-down inverted image, or the like of the illumination system. The image of the illumination system has contour or pattern corresponding to the plural element lenses constituting the first multi-lens disposed at the conjugate positions with respect to the light modulation devices when the illumination system is constituted by the first and second multi-lenses, for example. Without the image of the illumination system being formed on the light emission portion of the light combining system, the image of the illumination system is formed on the screen surface where the overlapped image of the respective light modulation devices is projected. Thus, the condition where the images that is formed by light emitting from the emission surface of the light combining system become a common image in the up-down and left-right directions when the images of the illumination system are combined by the light combining system corresponds to the condition where the images of the illumination system produced by the first and second color lights having passed through the first and second optical paths are projected on the screen surface as the overlapped images of which the up-down and left-right directions are common.

From the viewpoint of symmetry, it is preferable that the length of the first optical path is equivalent to the length of the second optical path. However, there is a possibility that the length of the second optical path needs to be relatively large considering combination of images. In this case, the magnification of the images of the illumination system formed on the respective light modulation devices are equalized by providing relay lens on the long optical path (hereinafter referred to as relay optical path) in related art. In this structure, problems such as relative inversion of the projected images of the illumination system produced by the respective color lights and loss of light amount with increase in the number of lenses are caused by addition of the relay lens. According to the projector of this aspect of the invention, however, the images of the illumination system produced by the color lights passing through the optical paths can be formed at the positions of the corresponding light modulation devices on the light emission side of the light combining system (more accurately, the screen surface on which the images of the light modulation devices are projected as the overlapped images) without relative inversion among the images of the color lights and without increase in the number of lenses from that of the relay optical path in the related-art structure. Moreover, the magnification of the images of the illumination system produced at the positions of the respective light modulation devices can be equalized by controlling relative image-formation conditions of the first and second optical paths in advance. Thus, deterioration of white balance and color unevenness of images projected by the projector can be reduced even when light emission distribution of the light source varies with elapse of time, for example.

According to the projector in an example of the invention, the light source emits light containing third color light. The color separation and light guide system divides light emitted from the light source into the first color light, the second color light, and the third color light. The light modulation unit further has a third light modulation device illuminated by the third color light separated by the color separation and light guide system. The light combining system is a cross dichroic prism. The cross dichroic prism combines the first color light, the second color light, and the third color light passing through the first light modulation device, the second light modulation device, and the third light modulation device and received through a plurality of light receiving surfaces corresponding to the plural light receiving portions, respectively, to emit the combined light from a light emission surface corresponding to the light emission portion. The length of the third optical path for directing the third color light traveling from the illumination system through the third light modulation device to the light emission surface corresponding to the light emission portion of the cross dichroic prism is equal to the length of the first optical path. The difference between the number of the reflection surfaces existing on the first optical path and the number of the reflection surfaces existing on the third optical path is an even number. An inverted image of the illumination system is formed at the position of the third light modulation device when the third optical path is replaced with a linear optical path having no reflection surface. In this structure, the length of the first optical path is equal to the length of the third optical path, and the difference between the number of the reflection surfaces existing on the first optical path and the number of the reflection surfaces existing on the third optical path is an even number. Thus, the images of the illumination system produced by the first and third color lights passing through the first and third optical paths are so combined as to become common images in the up-down and left-right directions on the light emission side of the cross dichroic prism.

According to another example of the invention, the light source emits light containing third color light. The color separation and light guide system separates light emitted from the light source into the first color light, the second color light, and the third color light. The light modulation unit further has a third light modulation device illuminated by the third color light separated by the color separation and light guide system. The light combining system is a cross dichroic prism. The cross dichroic prism combines the first color light, the second color light, and the third color light passing through the first light modulation device, the second light modulation device, and the third light modulation device and received through a plurality of light receiving surfaces corresponding to the plural light receiving portions, respectively, to emit the combined light from a light emission surface corresponding to the light emission portion. The length of the third optical path for directing the third color light traveling from the illumination system through the third light modulation device to the light emission surface corresponding to the light emission portion of the cross dichroic prism is equal to the length of the second optical path. The difference between the number of the reflection surfaces existing on the second optical path and the number of the reflection surfaces existing on the third optical path is an even number. An inverted image of the illumination system is formed at the position of the third light modulation device when the third optical path is replaced with a linear optical path having no reflection surface. In this structure, the length of the second optical path is equal to the length of the third optical path, and the difference between the number of the reflection surfaces existing on the second optical path and the number of the reflection surfaces existing on the third optical path is an even number. Thus, the images of the illumination system produced by the second and third color lights passing through the second and third optical paths are so combined as to become common images in the up-down and left-right directions on the light emission side of the cross dichroic prism.

According to further example of the invention, the illumination system has a light dividing optical element which divides light emitted from the light source into a plurality of partial lights, and a superimposing system which overlaps the plural partial lights on the first light modulation device and the second light modulation device. The superimposing system has a first superimposing lens which overlaps the plural partial lights of the first color light contained in the plural partial lights on the first light modulation device, and a second superimposing lens which overlaps the plural partial lights of the second color light contained in the plural partial lights on the second light modulation device. The first superimposing lens is disposed in the area of the first optical path not overlapping with the second optical path. The second superimposing lens is disposed in the area of the second optical path not overlapping with the first optical path. In this structure, the images of the illumination system produced on the respective light modulation devices on the first and second optical paths can be separately adjusted by separately controlling the power and positions of the first and second superimposing lenses provided separately.

According to a still further example, the illumination system has a light dividing optical element which divides light emitted from the light source into a plurality of partial lights, and a superimposing system which overlaps the plural partial lights on the first light modulation device, the second light modulation device and a third light modulation device. The superimposing system has a first superimposing lens which overlaps the plural partial lights of the first color light contained in the plural partial lights on the first light modulation device and overlaps the plural partial lights of the third color light contained in the plural partial lights on the third light modulation device, and a second superimposing lens which overlaps the plural partial lights of the second color light contained in the plural partial lights on the second light modulation device. The first superimposing lens is disposed in the area of the first optical path overlapping with the third optical path and not overlapping with the second optical path. The second superimposing lens is disposed in the area of the second optical path not overlapping with the first optical path and the third optical path. In this structure, the images of the illumination system produced on the respective light modulation devices on the first and second optical paths can be separately adjusted by separately controlling the power and positions of the first and second superimposing lenses provided separately. Moreover, the number of lenses can be decreased by providing the first superimposing lens as a common lens for the first and third optical paths.

According to still further example of the invention, at least either the first superimposing lens or the second superimposing lens includes a plurality of lenses. In this structure, a first lens and a second lens are disposed on the second optical path to function as a superimposing lens, for example. In this case, the second superimposing lens disposed on the second optical path longer than the first optical path has a focal distance equivalent to that of the first superimposing lens disposed on the first and third optical paths. The second lens may be constituted by two lenses, for example. In this case, the function of highly accurate lens can be provided by two ordinary lenses.

According to still further example, the illumination system has a light dividing optical element which divides light emitted from the light source into a plurality of partial lights, and a superimposing system which overlaps the plural partial lights on the first light modulation device and the second light modulation device in the case where the length of the second optical path is equal to that of the third optical path. The superimposing system has a first superimposing lens which overlaps the plural partial lights of the first color light contained in the plural partial lights on the first light modulation device, and a second superimposing lens which overlaps the plural partial lights of the second color light contained in the plural partial lights on the second light modulation device. The first superimposing lens includes a plurality of lenses. The second superimposing lens includes a plurality of lenses. At least one lens contained in the first superimposing lens is a common lens included in the second superimposing lens. The common lens is disposed before light emitted from the light source is separated into the respective color lights by the color separation and light guide system. In this structure, at least one lens contained in the first superimposing lens is a common lens included in the second superimposing lens. Thus, the lens structure of each optical path can be simplified.

According to still further example, the illumination system has a light dividing optical element which divides light emitted from the light source into a plurality of partial lights, and a superimposing system which overlaps the plural partial lights on the first light modulation device, the second light modulation device, and the third light modulation device. The superimposing system has a first superimposing lens which overlaps the plural partial lights of the first color light contained in the plural partial lights on the first light modulation device, a second superimposing lens which overlaps the plural partial lights of the second color light contained in the plural partial lights on the second light modulation device, and a third superimposing lens which overlaps the plural partial lights of the third color light contained in the plural partial lights on the third light modulation device. The second superimposing lens includes a plurality of lenses. The third superimposing lens includes a plurality of lenses. In this structure, the images of the illumination system on the respective light modulation devices can be separately controlled by the first, second, and third superimposing lenses provided separately.

According to still further example, the illumination system further includes an optical element which is disposed between the light dividing element and the superimposing system to converge the plural partial lights divided by the light dividing optical element.

For achieving the above object, a projector according to a second aspect of the invention includes: a light source which emits light containing first color light and second color light; a light dividing optical element which divides light emitted from the light source into a plurality of partial lights; a color separation and light guide system which separates light emitted from the light dividing optical element into the first color light and the second color light; a light modulation unit which has a first light modulation device and a second light modulation device illuminated by the first color light and the second color light, respectively, separated by the color separation and light guide system; a cross dichroic prism which combines the first color light and the second color light passing through the first light modulation device and the second light modulation device and received through a plurality of light receiving surfaces to emit the combined light from a light emission surface; and a superimposing system which overlaps the plural partial lights on the first light modulation device and the second light modulation device. The length of the first optical path for directing the first color light traveling from the light dividing optical element through the first light modulation device to the light emission surface of the cross dichroic prism is shorter than the length of the second optical path for directing the second color light traveling from the light dividing optical element through the second light modulation device to the light emission surface of the cross dichroic prism. The color separation and light guide system has at least one reflection surface. The difference between the number of the reflection surfaces existing on the first optical path and the number of the reflection surfaces existing on the second optical path is an even number. An inverted image of the light dividing element is formed at the position of the first light modulation device when the first optical path is replaced with a linear optical path having no reflection surface. An inverted image of the light dividing element is formed at the position of the second light modulation device when the second optical path is replaced with a linear optical path having no reflection surface.

According to the projector of the second aspect of the invention, inverted images of the light dividing optical element are formed at the positions of the first and second light modulation devices when the first and second optical paths having different lengths are replaced with linear optical paths, and the difference between the number of the reflection surfaces existing on the first optical path and the number of the reflection surfaces existing on the second optical path is an even number. Thus, when the images of the light dividing optical element produced by the first and second color lights passing through the first and second optical paths are formed on the first and second light modulation devices and combined by the cross dichroic prism, relative inversion among the images of the color lights which are combined can be prevented. That is, the image of the optical path light dividing optical element produced by the first color light on the first optical path and the image of the optical path light dividing optical element produced by the second color light on the second optical path are combined to become a common image in the up-down and left-right directions on the light emission side of the cross dichroic prism (more accurately, the screen surface on which the images of the light modulation devices are projected as the overlapped images) even when the second optical path is longer than the first optical path.

According to still further example, the light source has a plurality of light emission sources. In this structure, illumination light received by the respective light modulation devices becomes bright light by providing the plural light emission sources. For example, ideal illumination light having symmetric characteristics can be supplied from the illumination system to the light modulation devices for respective colors by disposing one light emission source for each of the up-down directional symmetry and left-right directional symmetry with respect to the system optical axis. On the other hand, when light is supplied from plural light emission sources to the illumination system, light having symmetric illuminance distribution in the up-down and left-right directions around the system optical axis is difficult to be supplied to the illumination system due to effects such as component difference and positional shift and combining system of the light source. As a result, illumination light having illuminance distribution whose symmetry is locally collapsed is easily produced. When light having illuminance distribution not symmetric in the up-down and left-right direction around the system optical axis is supplied to the illumination system, symmetry of illuminance in the image forming areas of the light modulation devices for the applied respective colors is locally collapsed. According to the structure of the invention, however, the images of the illumination system combined by the cross dichroic prism and projected on the screen are aligned in the up-down and left-right directions. Thus, color unevenness of the projection images can be reduced. For the same reason, color unevenness of the projection images is difficult to be produced even when light emission conditions and the like of the plural light emission sources vary with elapse of time thereby causing fluctuations in the light emission conditions and the like of the respective light emission sources.

DETAILED DESCRIPTION OF THE INVENTION

First Embodiment

Figure 1:
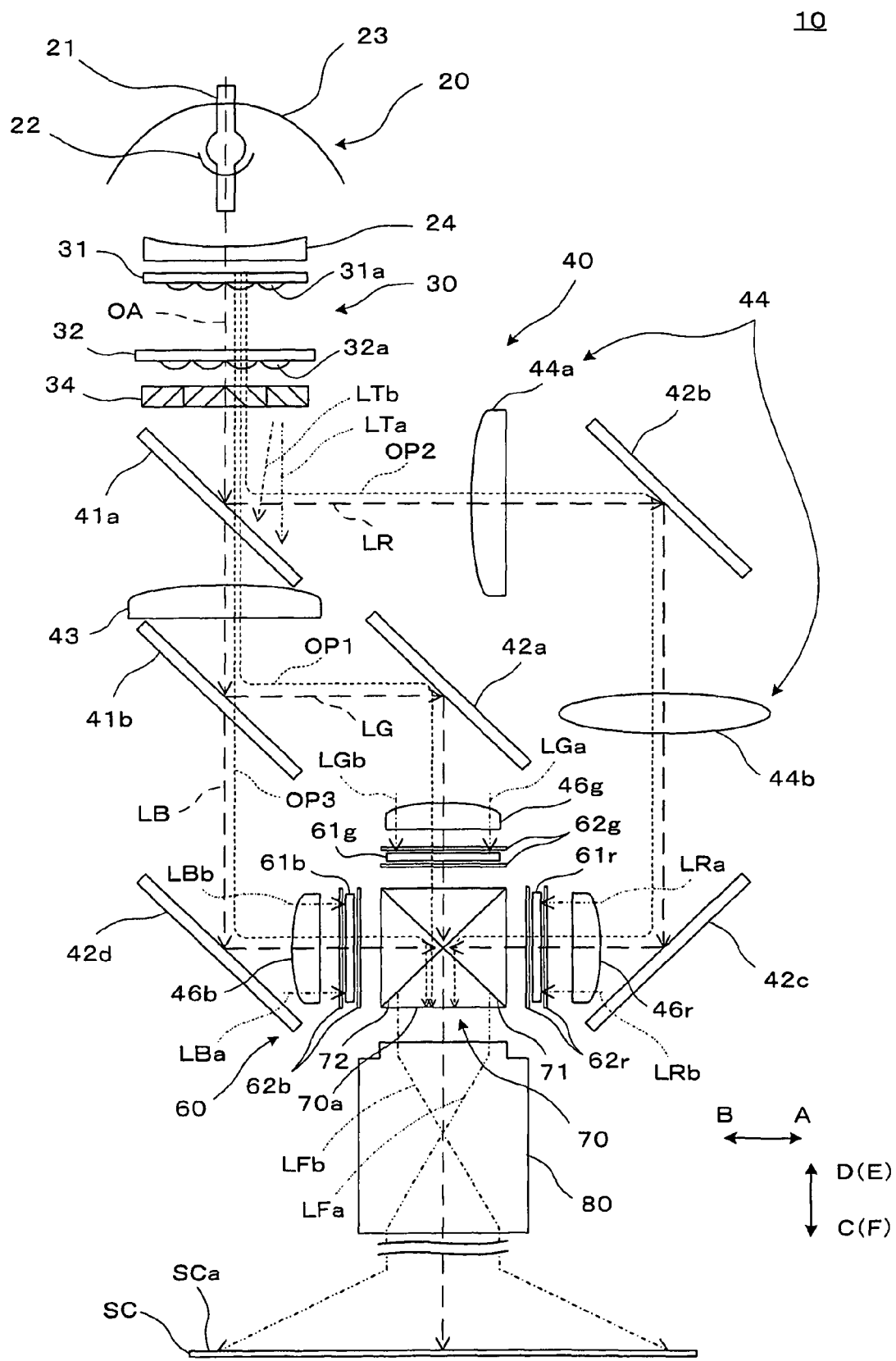
FIG. 1 illustrates a concept structure of optical systems of a projector according to a first embodiment.

FIG. 1 illustrates a concept structure of optical systems of a projector according to a first embodiment of the invention.

A projector 10 is an optical apparatus which forms color optical images by modulating light emitted from a light source according to image information and enlarges and projects the optical images on a screen SC. The projector 10 includes a light source lamp unit 20 as a light source, an illumination system 30, a color separation and light guide system 40, a light modulation unit 60, a cross dichroic prism 70, and a projection system 80. The light source lamp unit 20 and the illumination system 30 constitute a lighting device which produces illumination light to be supplied to the color separation and light guide system 40 and other units. First, second, and third optical paths OP1, OP2, and OP3 along which green light LG, red light LR, and blue light LB are guided are provided between the illumination system 30 and the cross dichroic prism 70.

The light source lamp unit 20 is a light source device which collects lights emitted from a lamp main body 21 toward the surrounding area and emits the collected lights to the light modulation unit 60 to illuminate the light modulation unit 60 through the illumination system 30 or the like. The lamp main body emits light containing the first through third color lights LG, LR, and LB. The light source lamp unit 20 has the lamp main body 21 as an arc tube, a spherical sub mirror 22 for reflecting light emitted from the lamp main body 21 toward the front, an ellipsoidal main mirror 23 for reflecting light emitted from the lamp main body 21 toward the rear, and a concave lens 24 for collimation. In the light source lamp unit 20, light emitted from the lamp main body 21 enters the main mirror 23 directly or via the sub mirror 22, and is reflected toward the front. Then, the reflected light is collimated by the concave lens 24 and emitted toward the illumination system 30.

The illumination system 30 is an optical system which divides light emitted from the light source lamp unit 20 into a plurality of partial lights and converts illumination light into polarized light in a specific direction. The illumination system 30 has a first multi-lens 31, a second multi-lens 32, a polarization converting device 34, and first and second superimposing lenses 43 and 44. The first and second superimposing lenses 43 and 44 are a part of components included in the illumination system 30 but are disposed in the color separation and light guide system 40. Thus, the positions and functions of the first and second superimposing lenses 43 and 44 will be discussed in detail in the description of the color separation and light guide system 40.

The first multi-lens 31 is referred as to a lens array and has function of light dividing optical element which divides light emitted from the lamp main body 21 into a plurality of partial lights, and contains a plurality of lens elements 31a disposed in matrix on a plane orthogonal to a system optical axis OA. The contour of each of the lens elements 31a is substantially similar to the shape of each image forming area of liquid crystal display panels 61g, 61r, and 61b constituting the light modulation unit 60 which will be described later. The second multi-lens 32 is an optical element which converges the plural partial lights divided by the first multi-lens 31 which will be described later. The second multi-lens 32 contains a plurality of lens elements 32a disposed in matrix on a plane orthogonal to the system optical axis OA similarly to the first multi-lens 31. However, each contour of the lens elements 32a provided for the purpose of convergence need not be precisely similar to the shape of each image forming area of the liquid crystal display panels 61g, 61r, and 61b. The first and second multi-lenses 31 and 32 discussed above and the first and second superimposing lenses 43 and 44 to be described later function as optical integrator which provides substantially equal in-plane illuminance in each image forming area of the liquid crystal display panels 61g, 61r, and 61b by dividing and overlapping received light.

The polarization converting device 34 includes PBS array and retardation film, and has function of converting polarization directions of the respective partial lights divided by the first multi-lens 31 into one-directional linear polarized light. The PBS array of the polarization converting device 34 the details of which are not shown in the figure has a structure containing polarized light separating films and reflection mirrors disposed inclined to the system optical axis OA alternately at predetermined intervals in the vertical direction to the system optical axis OA. The polarized light separating films transmit either P-polarized light or S-polarized light contained in the respective partial lights and reflect the other polarized light. The other polarized light thus reflected is bended by the reflection mirrors and emitted in the direction for releasing the one polarized light, that is, in the direction along the system optical axis OA. The polarization direction of either the P-polarized light or the S-polarized light thus emitted is converted by the retardation film provided on the light emission surface of the polarization converting device 34 in the form of strips such that the polarization directions of all the polarized lights are equalized. Since light emitted from the lamp main body 21 can be converted into one-directional polarized light by the function of the polarization converting device 34, utilization efficiency of light emitted from the light source and used by the light modulation unit 60 can be improved.

The color separation and light guide system 40 is an optical system which separates the plural partial lights having passed the illumination system 30 into color lights in three primary colors LG, LR, and LB, and guides the respective color lights to the corresponding liquid crystal display panels 61g, 61r, and 61b. The color separation and light guide system 40 has first and second dichroic mirrors 41a and 41b as plural reflection surfaces, a green light reflection mirror 42a, red light reflection mirrors 42b and 42c, and a blue light reflection mirror 42d. The color separation and light guide system 40 further has first, second, and third field lenses 46g, 46r, and 46b. The green light LG, red light LR, and blue light BL of illumination light are guided from a common optical path, and branched along three individual optical paths by the color separation and light guide system 40. These three optical paths are referred to as first, second, and third optical paths OP1, OP2, and OP3. The three optical paths include a common optical path, and extend from the illumination system 30 (more specifically, the first multi-lens 31) to the cross dichroic prism 70 (more specifically, a light emission surface 70a) which will be described later.

The first and second dichroic mirrors 41a and 41b are branching mirrors for separating illumination light into three primary color lights. The dichroic mirrors 41a and 41b are optical elements produced by forming dielectric multilayer film having a wavelength selection function on a transparent substrate, which film reflects light in predetermined wavelength range and transmits light in the other wavelength range. Both the dichroic mirrors 41a and 41b are disposed inclined to the system optical axis OA. The first dichroic mirror 41a reflects the red light LR of the three color lights in green, red, and blue (G, R, B), and transmits the green light LG and blue light LB. The second dichroic mirror 41b reflects the green light LG of the received green light LG and blue light LB, and transmits the blue light LB. As a result, illumination light traveling from the light source lamp unit 20 through the illumination system 30 to the color separation and light guide system 40 is separated into the red light LR reflected by the first dichroic mirror 41a and guided to the liquid crystal display panel 61r disposed upstream, the green light LG passing through the first dichroic mirror 41a, reflected by the second dichroic mirror 41b and guided to the liquid crystal display panel 61g disposed upstream, and the blue light LB passing through the first and second dichroic mirrors 41a and 41b and guided to the liquid crystal display panel 61b disposed upstream. In this structure, the length of the first optical path OP1 for the green light LG is equal to the length of the third optical path OP3 for the blue light LB. However, the second optical path OP2 for the red light LR is longer than the first optical path OP1 for the green light LG.

The first superimposing lens 43 is an optical element which converges plural partial lights of the green light LG and blue light LB having passed the first dichroic mirror 41a and overlaps the plural partial lights on the image forming areas of the liquid crystal display panels 61g and 61b for the green light LG and blue light LB to be described later to supply the overlapped light thereto. The first superimposing lens 43 is disposed at a position where the first optical path OP1 does not overlap with the second optical path OP2 and where the first optical path OP1 overlaps with the third optical path OP3. The first and third field lenses 46g and 46b are optical elements which convert the received plural partial lights into lights parallel with the chief rays of the respective partial lights. The green light LG and the blue light LB having passed through the first and second multi-lenses 31 and 32 and the first superimposing lens 43 travel through the first and third field lenses 46g and 46b and illuminate the light receiving area of the light modulation unit 60 to be described later, that is, the image forming areas of the liquid crystal display panels 61g and 61b with substantially equal illuminance after staked thereon.

The second superimposing lens 44 is constituted by a first lens 44a and a second lens 44b. In this structure, the second lens 44b of the second superimposing lens 44 has the chief function as superimposing lens. That is, the converging force of the second lens 44b is larger than that of the first lens 44a (lens power of the second lens 44b is larger).

Similarly to the first superimposing lens 43, the second superimposing lens 44 is an optical element which converges the plural partial lights of the red light LR having passed through the first dichroic mirror 41a and overlaps the plural partial lights on the image forming area of the liquid crystal display panel 61r for the red light LR to be described later to supply the overlapped light thereto. The second superimposing lens 44 is disposed on the second optical path OP2 at a position not overlapping with the first optical path OP1 and the third optical path OP3. The second field lens 46r is an optical element which converts the received plural partial lights into lights parallel with the chief rays of the respective partial lights. The red light LR having passed through the first and second multi-lenses 31 and 32 and the second superimposing lens 44 travels through the second field lens 46r to be overlapped on the light receiving area of the light modulation unit 60 to be described later, that is, the image forming area of the liquid crystal display panel 61r with substantially equal illuminance.

The green light reflection mirror 42a bends the green light LG transmitted by the first dichroic mirror 41a and the first superimposing lens 43 and bended in the orthogonal direction by the second dichroic mirror 41b again in the orthogonal direction to direct the green light LG toward the liquid crystal display panel 61g. The red light reflection mirrors 42b and 42c bend the red light LR bended in the orthogonal direction by the first dichroic mirror 41a and transmitted by the first lens 44a and the second lens 44b again in the orthogonal direction to direct the red light LR toward the liquid crystal display panel 61r. The blue light reflection mirror 42d bends the blue light LB having passed through the first dichroic mirror 41a, the first superimposing lens 43, and the second dichroic mirror 41b toward the liquid crystal display panel 61b. In this structure, the second and third optical paths OP2 and OP3 for the red light LR and the blue light LB extend parallel with the sheet surface of the figure similarly to the first optical path OP1 for the green light LG. That is, the system optical axes OA for respective colors corresponding to the respective optical paths OP1, Op2, and OP3 are contained on a common flat plane and arranged two-dimensionally.

Figure 2:
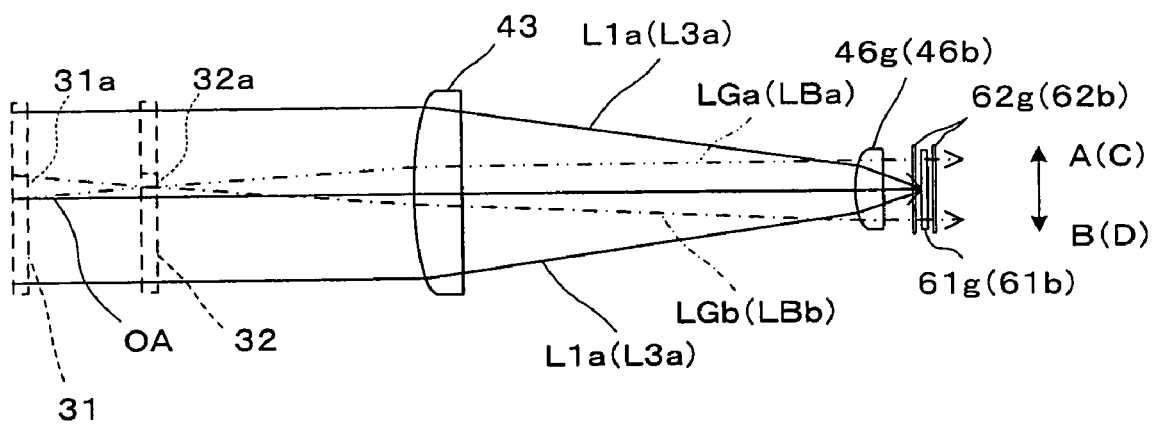
FIG. 2 illustrates conditions of light on first and third optical paths shown in FIG. 1.
Figure 3:
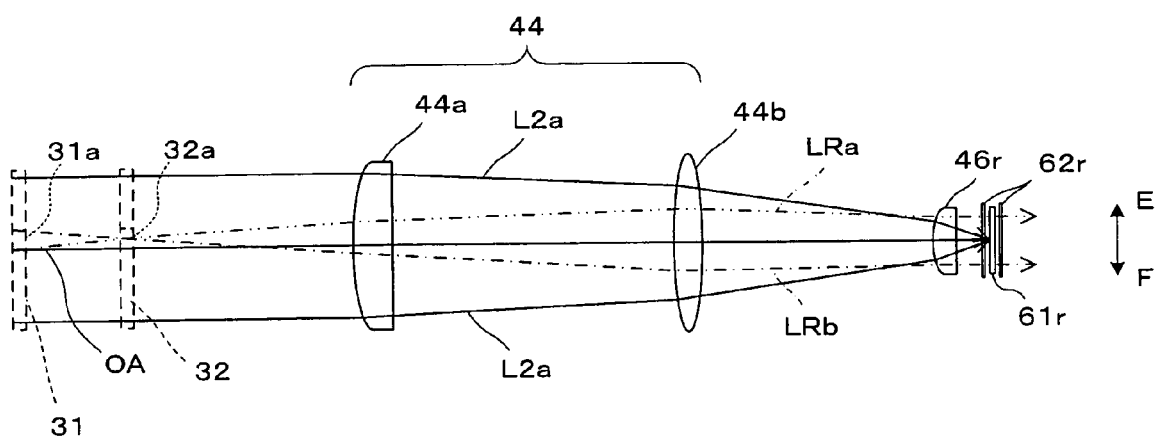
FIG. 3 illustrates condition of light on a second optical path shown in FIG. 1.

The light condition in the color separation and light guide system 40 is now described. FIG. 2 illustrates the condition of light along the first and third optical paths OP1 and OP3. FIG. 3 illustrates the condition of light along the second optical path OP2. FIGS. 2 and 3 illustrate a simplified structure which shows the condition of light along a linear optical path including no reflection by the dichroic mirrors 41a and 41b and the reflection mirrors 42a, 42b, 42c, and 42d on the optical paths OP1, OP2, and OP3 in place of the optical paths OP1, OP2, and OP3. That is, these figures show a virtual condition on a linear optical path having no reflection surface in place of the optical paths OP1, OP2, and OP3. Solid lines in FIGS. 2 and 3 show the condition of parallel lights entering the superimposing lenses 43 and 44. Alternate long and two short dashes lines in FIGS. 2 and 3 show the condition of lights emitted from the B, D, and F sides of each lens element 31a of the first multi-lens 31 and entering from the position of the second multi-lens 32 to A, C, and E sides of the liquid crystal display panels 61g, 61b, and 61r. Alternate long and short dash lines in FIGS. 2 and 3 show the condition of lights emitted from the A, C, and E sides of each lens element 31a of the first multi-lens 31 and entering from the position of the second multi-lens 32 to the B, D, and F sides of the liquid crystal display panels 61g, 61b, and 61r.

The first superimposing lens 43 and the first field lens 46g are disposed on the first optical path OP1. Parallel beam L1a having entered the first superimposing lens 43 on the first optical path OP1 passes through the first field lens 46g to be overlapped on the image forming area of the liquid crystal display panel 61g. The first lens 44a, the second lens 44b, and the second field lens 46r are disposed on the second optical path OP2. Parallel beam L2a having entered the second superimposing lens 44 constituted by the pair of the lenses 44a and 44b on the second optical path OP2 passes through the second field lens 46r to be overlapped on the image forming area of the liquid crystal display panel 61r. The first superimposing lens 43 and the third field lens 46b are disposed on the third optical path OP3. Parallel beam L3a having entered the first superimposing lens 43 on the third optical path OP3 passes through the third field lens 46b to be overlapped on the image forming area of the liquid crystal display panel 61b.

Beams LTa and LTb as parts of the same partial lights emitted from the illumination system 30 shown in FIG. 1 are separated into beams in respective colors by transmission and reflection by the first and second dichroic mirrors 41a and 41b. More specifically, the beam LTa is separated into green beam LGa, red beam LRa, and blue beam LBa. Also, the beam LTb is separated into green beam LGb, red beam LRb, and blue beam LBb.

As illustrated in FIG. 2, the green beam LGa and the blue beam LBa emitted from the B and D sides of the lens element 31a and transmitted by the lens element 32a and the first superimposing lens 43 enter the A and C sides of the liquid crystal display panels 61g and 61b on the first and third optical paths OP1 and OP3. On the contrary, the green beam LGb and the blue beam LBb emitted from the A and C sides of the lens element 31a and transmitted through the B and D sides of the lens element 32a and the first superimposing lens 43 enter the B and D sides of the liquid crystal display panels 61g and 61b on the first and third optical paths OP1 and OP3. More specifically, assuming that the beams LGa, LBa, LGb, and LBb are not reflected by the dichroic mirrors 41a and 41b and the reflection mirrors 42a and 42d on the first and third optical paths OP1 and OP3, the image of the lens element 31a is not formed at an intermediate position between the lens element 31a and the liquid crystal display panels 61g and 61b. In this case, an inverted image of each lens element 31a constituting the first multi-lens 31 (inverted image of the illumination system 30) is formed at the positions of the liquid crystal display panels 61g and 61b. Actually, a plurality of divided lights emitted from the first multi-lens 31 are reflected twice by the second dichroic mirror 31b and the green light reflection mirror 42a on the first optical path OP1 extending from the light entrance surface of the first multi-lens 31 of the illumination system 30 through the liquid crystal display panel 61g to the light emission surface of the cross dichroic prism 70, and form an inverted image (inverted in the up-down and left-right directions) at the position of the liquid crystal display panel 61g as illustrated in FIG. 1. On the other hand, a plurality of divided lights emitted from the first multi-lens 31 are reflected once by the blue light reflection mirror 42d on the third optical path OP3 extending from the light entrance surface of the first multi-lens 31 of the illumination system 30 through the liquid crystal display panel 61b to the light emission surface of the cross dichroic prism 70, and form an inverted image in the up-down direction on the liquid crystal display panel 61b as viewed along the third optical path OP3.

Similarly, as illustrated in FIG. 3, the red beam LRa emitted from the F side of the lens element 31a and transmitted through the lens element 32a, the first lens 44a, and the second lens 44b enters the E side of the liquid crystal display panel 61r in the second optical path OP2. The red beam LRb travels from the E side of the lens element 31a through the lens element 32a and the first and second lenses 44a and 44b, and enters the F side of the liquid crystal display panel 61r. More specifically, assuming that the respective beams LRa and LRb are not reflected by the first dichroic mirror 41a and the reflection mirrors 42b and 42c in the second optical path OP2, the image of the lens element 31a is not formed at an intermediate position between the lens element 31a and the liquid crystal display panel 61r. In this case, an inverted image of each of the lens elements 31a constituting the first multi-lens 31 (inverted image of the illumination system 30) is formed at the position of the liquid crystal display panel 61r. Actually, as illustrated in FIG. 1, a plurality of divided lights emitted from the first multi-lens 31 are reflected three times by the first dichroic mirror 41a and the red light reflection mirrors 42b and 42c on the second optical path OP2 extending from the light entrance surface of the first multi-lens 31 of the illumination system 30 through the liquid crystal display panel 61r to the light emission surface of the cross dichroic prism 70, and form an inverted image on the liquid crystal display panel 61r in the up-down direction as viewed along the third optical path OP3.

Returning to FIG. 1, the light modulation unit 60 has the three liquid crystal display panels 61g, 61r, and 61b to which the illumination lights LG, LR, and LB in three colors are supplied, respectively. In this structure, the liquid crystal display panel 61g for the green light LG and a pair of polarization filters 62g and 62g between which the liquid crystal display panel 61g is interposed constitute a liquid crystal light valve for green light which two-dimensionally modulates luminance of illumination light based on the image information. The liquid crystal display panel 61r for the red light LR and a pair of polarization filters 62r and 62r between which the liquid crystal display panel 61r is interposed constitute a liquid crystal light valve for red light. Similarly, the liquid crystal display panel 61b for the blue light LR and a pair of polarization filters 62b and 62b between which the liquid crystal display panel 61b is interposed constitute a liquid crystal light valve for blue light. Each of the liquid crystal display panels 61g, 61r, and 61b is produced by sealing liquid crystals as electro-optical substances between a pair of transparent glass substrates, and modulates the polarization direction of received polarized light according to inputted image signals using polysilicon TFT as switching elements, for example.

The green light LG guided to the first optical path OP1 enters the light receiving area of the liquid crystal display panel 61g via the first superimposing lens 43, the green light reflection mirror 42a, and the first field lens 46g to illuminate the image forming area of the liquid crystal display panel 61g. The red light LR guided to the second optical path OP2 enters the light receiving area of the liquid crystal display panel 61r via the first lens 44a, the red light reflection mirror 42b, the second lens 44b, the red light reflection mirror 42c, and the second field lens 46r to illuminate the image forming area of the liquid crystal display panel 61r. The blue light LB guided to the third optical path OP3 enters the light receiving area of the liquid crystal display panel 61b via the first superimposing lens 43, the second dichroic mirror 41b, the blue light reflection mirror 42d, and the third field lens 46b to illuminate the image forming area of the liquid crystal display panel 61b.

The liquid crystal display panels 61g, 61r, and 61b as non-emission and transmission type first through third light modulation devices vary the spatial distribution of the polarization direction of received illumination light. The polarization conditions of the illumination lights LG, LR, and LB entering the liquid crystal display panels 61g, 61r, and 61b are controlled by pixel according to drive signals or control signals inputted to the liquid crystal display panels 61g, 61r, and 61b as electric signals. In this case, the polarization directions of the illumination lights entering the liquid crystal display panels 61g, 61r, and 61b are controlled by the function of the polarization filters 62g, 62r, and 62b, and modulated lights in predetermined polarization direction are extracted from lights emitted from the liquid crystal display panels 61g, 61r, and 61b by the function of the polarization filters 62g, 62r, and 62b.

The cross dichroic prism 70 as the light combining system combines optical images modulated for each of the color lights LG, LR, and LB emitted from the polarization filters 62g, 62r, and 62b to form a color image. The cross dichroic prism 70 has a square shape in the plan view produced by affixing four rectangular prisms. A pair of dielectric multilayer films 71 and 72 crossing each other in X shape are provided on the boundaries of the affixed rectangular prisms. The first dielectric multilayer film 71 reflects the blue light LB, and the second dielectric multilayer film 72 reflects the red light LR. The cross dichroic prism 70 reflects the blue light LB emitted from the liquid crystal display panel 61b by the first dielectric multilayer film 71 such that the blue light LB travels to the right with respect to the traveling direction, reflects the red light LR emitted from the liquid crystal display panel 61r by the second dielectric multilayer film 72 such that the red light LR travels to the left with respect to the traveling direction, and directs the green light LG emitted from the liquid crystal display panel 61g to travel straight to the outside of the cross dichroic prism 70 via the first and second dielectric multilayer films 71 and 72. That is, the red light LR and the blue light LB are guided to the cross dichroic prism 70 in the bended directions within the cross dichroic prism 70, and the green light LG is guided to the cross dichroic prism in the straight direction within the cross dichroic prism 70. Thus, the cross dichroic prism 70 which receives the color lights LG, LR, and LB having passed from the plural light entrance surfaces as the plural light receiving portions through the liquid crystal display panels 61g, 61r, and 61b combines the color lights LG, LR, and LB by transmission or reflection on the two dielectric multilayer films having different characteristics, and emits the combined light from the light emission surface 70a as light emission portion.

Considering image inversion, the plural divided lights emitted from the plural lens elements 31a constituting the first multi-lens 31 on the first optical path OP1 are reflected twice between the light entrance surface of the first multi-lens 31 of the illumination system 30 and the light emission surface of the cross dichroic prism 70 as illustrated in FIG. 1. The plural divided lights emitted from the plural lens elements 31a constituting the first multi-lens 31 on the second optical path OP2 are reflected four times between the light entrance surface of the first multi-lens 31 of the illumination system 30 and the light emission surface of the cross dichroic prism 70. The plural divided lights emitted from the plural lens elements 31a constituting the first multi-lens 31 on the third optical path OP3 are reflected twice between the light entrance surface of the first multi-lens 31 of the illumination system 30 and the light emission surface of the cross dichroic prism 70. The image of the lens element 31a of the first multi-lens produced by the green light LG projected from the projection system 80 for forming inverted images on the liquid crystal display panels 61g, 61r, and 61b is an erect image. Similarly, the image of the lens element 31a of the first multi-lens 31 produced by the red light LR projected from the projection system 80 is an erect image. Similarly, the image of the lens element 31a of the first multi-lens 31 produced by the blue light LB projected from the projection system 80 is an erect image. Thus, the image projected by the projection system 80 is an image produced by overlapping respective images of the lens element 31a of the first multi-lens 31 formed by all the illumination lights LG, LR, and LB in the condition not relatively inverted.

The image light combined by the cross dichroic prism 70 in this manner passes through the projection system 80 as enlarging and projecting lens to be projected on the screen SC with appropriate magnification as a color image. The projection system 80 is an optical system which projects inverted images of the liquid crystal display panel 61g and others. Thus, the projection image of the illumination system 30 on a screen surface SCa of the screen SC becomes an erect image having no relative inversion as discussed above. More specifically, the projection image of each lens element 31a of the first multi-lens 31 produced by each of the green light LG, the red light LR, and the blue light LB on the screen surface SCa becomes an erect image.

According to the structure including the first and second multi-lenses 31 and 32 and the first and second superimposing lenses 43 and 44, light having symmetric illuminance distribution on the first multi-lens 31 in the up-down and left-right directions with respect to the system optical axis OA can be applied to the image forming areas of the liquid crystal display panels 61g, 61r, and 61b with extremely uniform in-plane illuminance. However, there is a possibility that light having asymmetric illuminance distribution on the first multi-lens 31 in the up-down and left-right directions with respect to the system optical axis OA is applied to the image forming areas of the liquid crystal display panels 61g, 61r, and 61b with slightly non-uniform in-plane illuminance. Thus, light entering the first multi-lens 31 has asymmetric illuminance distribution in the up-down and left-right directions with respect to the system optical axis OA in some cases due to individual difference of the components constituting the light source lamp unit 20 and errors in the relative positions of the components. When the image of the lens element 31a of the first multi-lens 31 produced by the color lights LG, LR, and LB projected from the projection system 80 as light having substantially uniform in-plane illuminance applied to the image forming areas of the liquid crystal display panels 61g, 61r, and 61b for displaying white images on the entire surface, for example, agrees with one another in the up-down and left-right directions, the observer does not feel the slight illuminance difference under the condition in which each illuminance of the illumination lights LG, LR, and LB does not vary in any portion within the projection image. On the other hand, when the image of the lens element 31a of the first multi-lens 31 produced by the color lights LG, LR, and LB projected from the projection system 80 as light having slightly non-uniform in-plane illuminance with respect to symmetry applied to the image forming areas of the liquid crystal display panels 61g, 61r, and 61b for displaying white images on the entire surface, for example, does not agree with one another in the up-down and left-right directions, the observer feels color unevenness in the portion where illuminance of the illumination lights LG, LR, and LB differs from one another within the projection image.

According to the projector 10 having this structure, an image of the lens element 31a of the first multi-lens is formed not on the optical path to the liquid crystal display panel 61r but on the liquid crystal display panel 61r on the second optical path OP2 longer than the first optical path OP1. Similarly to the case of the second optical path OP2, an image of the lens element 31a of the first multi-lens 31 is formed not on the optical path to the liquid crystal display panel 61g but on the liquid crystal display panel 61g on the first optical path OP1. Furthermore, the difference between the number of the reflection surfaces existing on the first optical path OP1 and the number of the reflection surfaces existing on the second optical path OP2 is an even number. In this case, zero is included in the even number. Thus, even in the structure where the lengths of the first and second optical paths OP1 and OP2 are different, the images of the lens element 31a produced by color lights projected from the projection system 80 after passing through the first and second optical paths OP1 and OP2 coincide with one another in the up-down and left-right directions. Moreover, since the lengths of the first optical path OP1 and the third optical path OP3 are equal with an even number difference between the number of the reflection surfaces existing on the first optical path OP1 and the number of the reflection surfaces existing on the third optical path OP3, the images of the lens element 31a of the illumination system 30 produced by the green light LG and the blue light LB projected on the screen surface SCa of the screen SC by the projection system 80 after passing through the first and third optical paths OP1 and OP3 coincide with one another in the up-down and left-right directions. More specifically, the first beam LFa emitted from one end side of the light emission surface 70a of the cross dichroic prism 70, passing through the projection system 80, and entering the right side of the screen surface SCa corresponds to the combination of the green beam LGa, red beam LRa, and blue beam LBa branched from a specific beam contained in the same partial lights having passed through the first multi-lens 31 of the illumination system 30. Also, the beam LFb emitted from one end side of the light emission surface 70a of the cross dichroic prism 70, passing through the projection system 80, and entering the left side of the screen surface SCa corresponds to the combination of the green beam LGb, red beam LRb, and blue beam LBb branched from another beam contained in the same partial lights having passed through the first multi-lens 31 of the illumination system 30. Thus, the images of the projected color lights LG, LR, and LB can agree with one another in the up-down and left-right directions by controlling the relative image forming conditions on the first, second, and third optical paths OP1, OP2, and OP3 having different lengths in advance. Thus, deterioration of the white balance of light projected by the projector 10 and color unevenness of the light can be reduced even when the light emission distribution of the light source varies with elapse of time, for example.

Second Embodiment

A projector according to a second embodiment of the invention is now described. The projector in the second embodiment is a projector produced by partially modifying the projector in the first embodiment, and similar components are not particularly explained herein.

Figure 4:
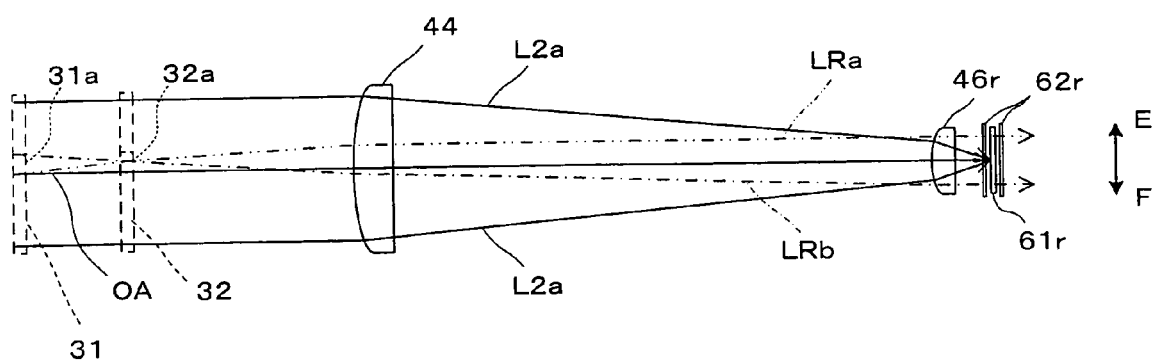
FIG. 4 illustrates a modified example of the second optical path shown in FIG. 1.

FIG. 4 corresponds to FIG. 3, showing a condition of light on the second optical path OP2 of the projector 10 according to the second embodiment. The second superimposing lens 44 constituted by one lens is disposed on the second optical path OP2 of the projector 10 in this embodiment. FIG. 4 shows a condition of light on a linear optical path from which reflection by the second dichroic mirror 41b and the reflection mirrors 42b and 42c on the second optical path OP2 is removed in place of the optical path OP2. Thus, the figure shows a virtual condition of a linear optical path having no reflection surface in place of the second optical path OP2.

On the second optical path OP2 in this embodiment, the red beam LRa emitted from the F side of the lens element 31a and passing through the lens element 32a and the second superimposing lens 44 enters the E side of the liquid crystal display panel 61r. The red beam LRb emitted from the E side of the lens element 31a and passing through the lens element 32a and the second superimposing lens 44 enters the F side of the liquid crystal display panel 61r. That is, assuming that the beams LRa and LRb are not reflected by the first dichroic mirror 41a and the reflection mirrors 42b and 42c on the second optical path OP2, an inverted image of the lens element 31a constituting the first multi-lens 31 is formed on the liquid crystal display panel 61r with no image of the lens element 31a formed at an intermediate position between the lens element 31a and the liquid crystal display panel 61r.

According to the projector 10 having this structure, an image of the lens element 31a of the first multi-lens 31 is formed not at a position before the liquid crystal display panel 61r but at a position on the liquid crystal display panel 61r on the second optical path OP2 longer than the first optical path OP1 while reducing the number of lenses disposed on the second optical path OP2 by providing the single second superimposing lens 44 on the second optical path OP2 longer than the first optical path OP1. Thus, deterioration of the white balance of light projected by the projector 10 and color unevenness of the light can be reduced similarly to the first embodiment.

Third Embodiment

A projector according to a third embodiment of the invention is now described. The projector in the third embodiment is a projector produced by partially modifying the projector in the first embodiment, and similar components are not particularly explained herein.

Figure 5:
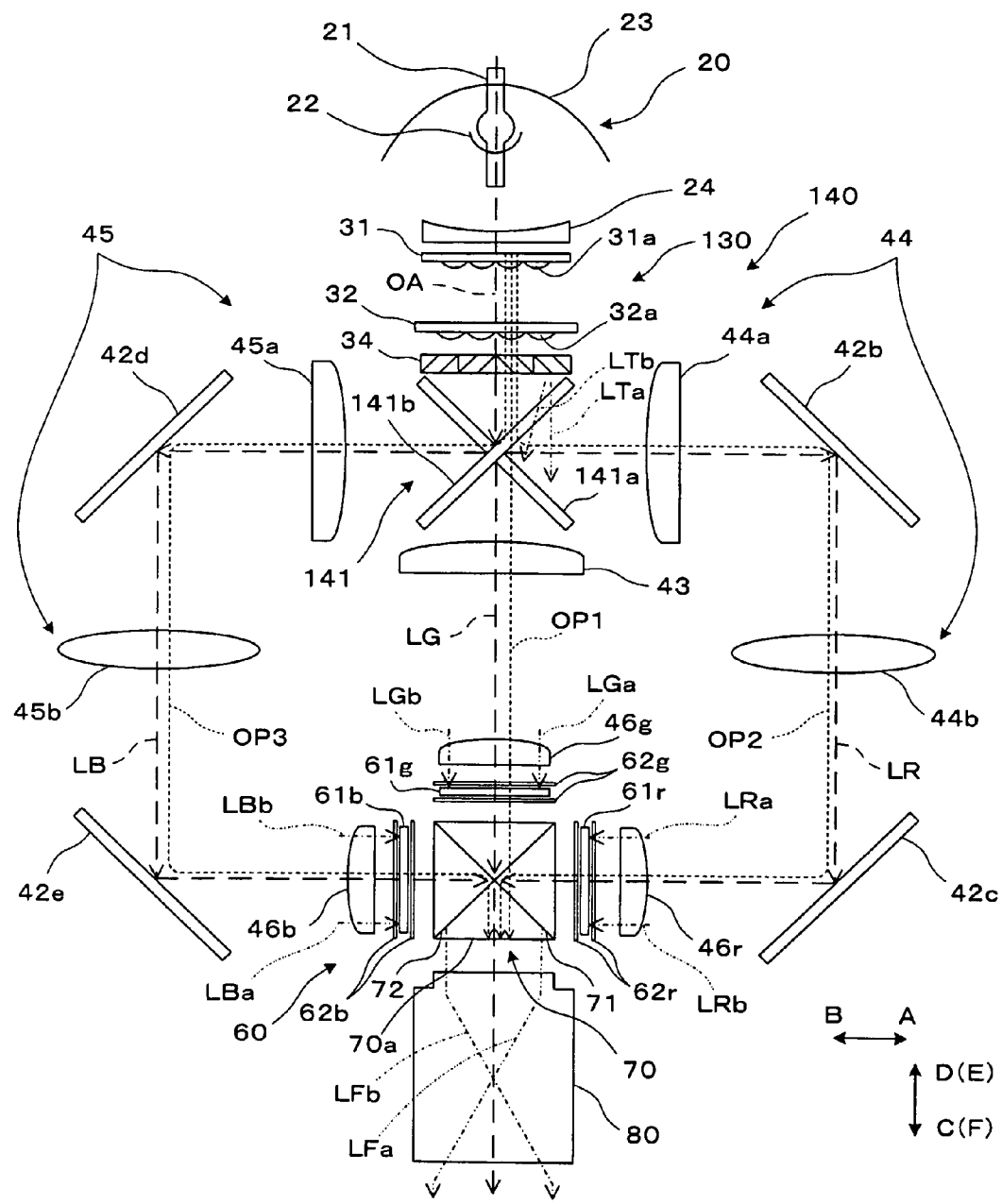
FIG. 5 illustrates a concept structure of optical systems of a projector according to a third embodiment.

FIG. 5 illustrates a concept of a structure of optical systems included in a projector 110 according to a third embodiment. The projector 110 in this embodiment includes the light source lamp unit 20, an illumination system 130, a color separation and light guide system 140, the light modulation unit 60, the cross dichroic prism 70, and the projection system 80.

The illumination system 130 is an optical system which divides light emitted from the light source lamp unit 20 into a plurality of partial lights and converts illumination light into polarized light in a specific direction, and has the first multi-lens 31, the second multi-lens 32, the polarization converting device 34, and the first and second superimposing lenses 43 and 44, and a third superimposing lens 45. The first, second, and third superimposing lenses 43, 44, and 45 are included in the illumination system 130, but disposed in the color separation and light guide system 140. Thus, the positions and functions of the first, second, and third superimposing lenses 43, 44, and 45 will be described in detail in the description of the color separation and light guide system 140.

The color separation and light guide system 140 includes a cross dichroic mirror 141, the red light reflection mirrors 42b and 42c, the blue light reflection mirrors 42d and 42e, and the first, second, and third field lenses 46g, 46r, and 46b.

The cross dichroic mirror 141 separates illumination light into three primary color lights. The cross dichroic mirror 141 is constituted by a pair of dichroic mirrors 141a and 141b crossing each other in X shape. The first dichroic mirror 141a reflects the red light LR, and the second dichroic mirror 141b reflects the blue light LB. The first and second dichroic mirrors 141a and 141b transmit the green light LG. Thus, light having passed through the cross dichroic mirror 141 is separated into the red light LR reflected by the first dichroic mirror 141a and directed to the second optical path OP2 disposed upstream, the blue light LB reflected by the second dichroic mirror 141b and directed to the third optical path OP3 disposed upstream, and the green light LG transmitted by the first and second dichroic mirrors 141a and 141b and directed to the first optical path OP1 disposed upstream.

The first superimposing lens 43 is an optical element which converges the plural partial lights of the green light LG having passed through the cross dichroic mirror 141 and supplies the plural overlapped partial lights to the image forming area of the liquid crystal display panel 61g. The first field lens 46g is an optical element which converts the received plural partial lights into lights parallel with the respective chief rays. The green light LG having passed through the first and second multi-lenses 31 and 32 and the first superimposing lens 43 travels through the first field lens 46g and illuminates the light receiving area of the light modulation unit 60, that is, the image forming area of the liquid crystal display panel 61g with substantially uniform illuminance after overlapped.

The second superimposing lens 44 is constituted by the first lens 44a and the second lens 44b. In this structure, the second lens 44b of the second superimposing lens 44 has the chief function of the superimposing lens.

Similarly to the first superimposing lens 43, the second superimposing lens 44 is an optical element which converges the plural partial lights of the red light LR having passed through the cross dichroic mirror 141 and overlaps the plural partial lights on the image forming area of the liquid crystal display panel 61r to supply the overlapped light thereto. The second field lens 46r is an optical element which converts the received plural partial lights into lights parallel with the chief rays of the respective partial lights. The red light LR having passed through the first and second multi-lenses 31 and 32 and the second superimposing lens 44 travels through the second field lens 46r and illuminates the light receiving area of the light modulation unit 60, that is, the image forming area of the liquid crystal display panel 61r with substantially equal illuminance after overlapped.

Similarly to the second superimposing lens 44, the third superimposing lens 45 is constituted by a third lens 45a and a fourth lens 45b. The fourth lens 45b of the third superimposing lens 45 has the chief function of the superimposing lens.

Similarly to the first and second superimposing lenses 43 and 44, the third superimposing lens 45 is an optical element which converges the plural partial lights of the blue light LB having passed through the cross dichroic mirror 141 and overlaps the plural partial lights on the image forming area of the liquid crystal display panel 61b to supply the overlapped light thereto. The third field lens 46b is an optical element which converts the received plural partial lights into lights parallel with the chief rays of the respective partial lights. The blue light LB having passed through the first and second multi-lenses 31 and 32 and the third superimposing lens 45 travels through the third field lens 46b and illuminates the light receiving area of the light modulation unit 60, that is, the image forming area of the liquid crystal display panel 61b with substantially equal illuminance after overlapped.

The red light reflection mirrors 42b and 42c bend the red light LR bended by the first dichroic mirror 141a in the orthogonal direction and transmitted by the first lens 44a and the second lens 44b again in the orthogonal direction toward the liquid crystal display panel 61r. The blue light reflection mirrors 42d and 42e bend the blue light LB bended by the second dichroic mirror 141b in the orthogonal direction and transmitted by the third lens 45a and the fourth lens 45b again in the orthogonal direction toward the liquid crystal display panel 61b.

In the light modulation unit 60, the green light LG guided to the first optical path OP1 enters the light receiving area of the liquid crystal display panel 61g via the first superimposing lens 43 and the first field lens 46g discussed above to illuminate the image forming area of the liquid crystal display panel 61g. The red light LR guided to the second optical path OP2 enters the light receiving area of the liquid crystal display panel 61r via the first lens 44a, the red light reflection mirror 42b, the second lens 44b, the red light reflection mirror 42c, and the second field lens 46r discussed above to illuminate the image forming area of the liquid crystal display panel 61r. The blue light LB guided to the third optical path OP3 enters the light receiving area of the liquid crystal display panel 61b via the third lens 45a, the blue light reflection mirror 42d, the fourth lens 45b, the blue light reflection mirror 42e, and the third field lens 46b discussed above to illuminate the image forming area of the liquid crystal display panel 61b.

According to the projector 110 having this structure, an image of the lens element 31a of the first multi-lens 31 is formed not on the optical path to the liquid crystal display panel 61g but on the liquid crystal display panel 61g on the first optical path OP1. Similarly to the first optical path OP1, images of the lens element 31a of the first multi-lens 31 are formed not on the optical paths to the liquid crystal display panels 61r and 61b but on the liquid crystal display panels 61r and 61b on the second and third optical paths OP2 and OP3 longer than the first optical path OP1. Furthermore, the difference between the number of the reflection surfaces existing on the first optical path OP1 and the number of the reflection surfaces existing on the second optical path OP2 is an even number, and the difference between the number of the reflection surfaces existing on the first optical path OP1 and the number of the reflection surfaces existing on the third optical path OP3 is an even number. In this case, zero is included in the even number. Thus, even in the structure where the length of the first optical path OP1 is different from each length of the second and third optical paths OP2 and OP3, the images of the lens element 31a produced by respective color lights projected by the projection system 80 after passing through these optical paths coincide with one another in the up-down and left-right directions. Moreover, since the lengths of the second optical path OP1 and the third optical path OP3 are equal with an even number difference between the number of the reflection surfaces existing on the second optical path OP2 and the number of the reflection surfaces existing on the third optical path OP3, the images of the lens element 31a of the illumination system 130 produced by the red light LR and the blue light LB passing through the second and third optical paths OP2 and OP3 and projected by the projection system 80 coincide with one another in the up-down and left-right directions with respect to the light emission side of the cross dichroic mirror 141. Thus, the images of the projected color lights LG, LR, and LB can agree with one another in the up-down and left-right directions by controlling the relative image forming conditions on the first, second, and third optical paths OP1, OP2, and OP3 the first optical path OP1 of which has a length different from those of the second and third optical paths OP2 and OP3 in advance. Thus, deterioration of the white balance of light projected by the projector 110 and color unevenness of the light can be reduced even when the light emission distribution of the light source varies with elapse of time, for example.

Fourth Embodiment

A projector according to a fourth embodiment of the invention is now described. The projector in the fourth embodiment is a projector produced by partially modifying the projector 10 in the first embodiment, and similar components are not particularly explained herein.

Figure 6:
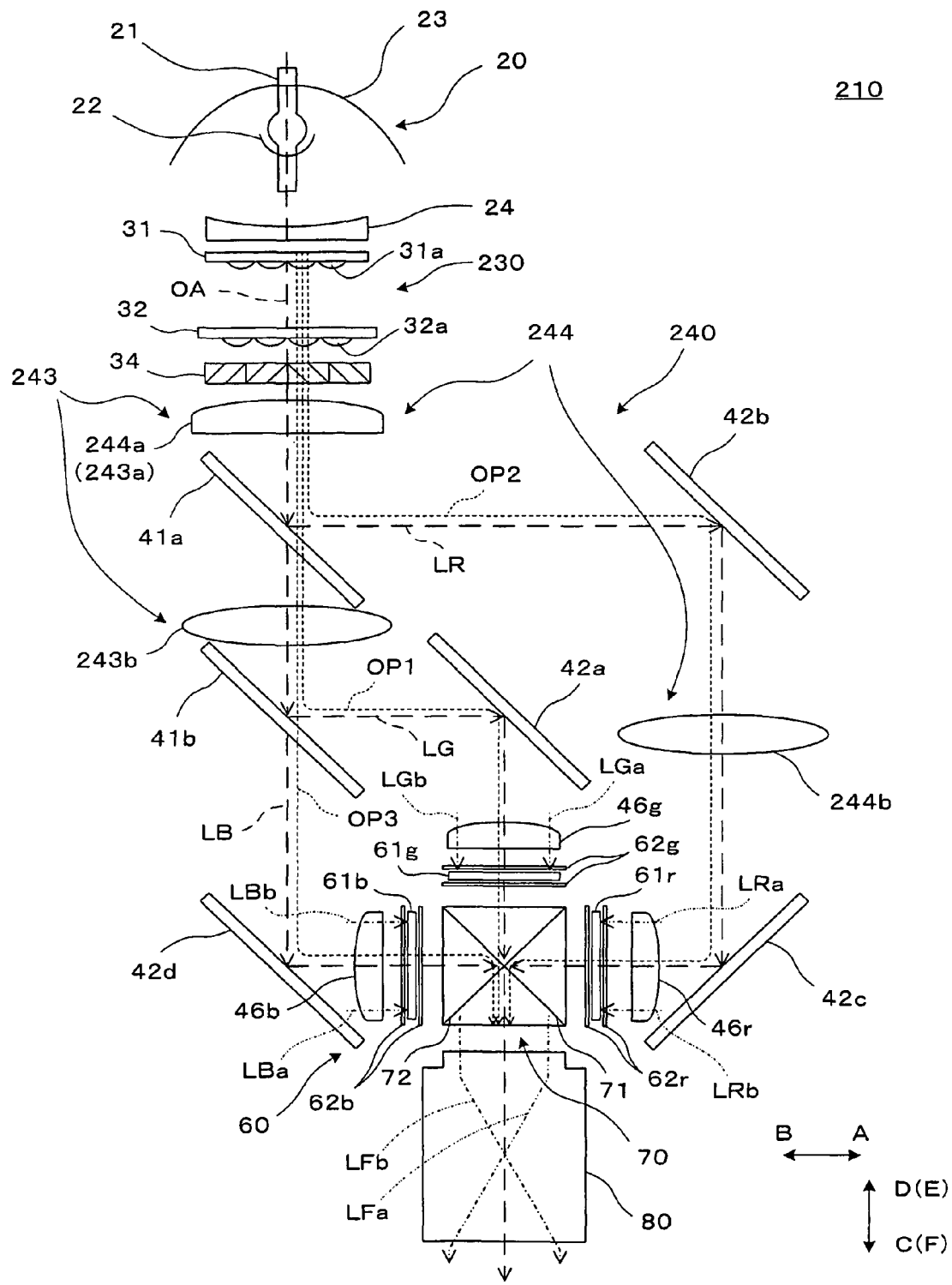
FIG. 6 illustrates a concept structure of optical systems of a projector according to a fourth embodiment.

FIG. 6 illustrates a concept of a structure of optical systems included in a projector 210 according to the fourth embodiment. The projector 210 in this embodiment includes the light source lamp unit 20, an illumination system 230, a color separation and light guide system 240, the light modulation unit 60, the cross dichroic prism 70, and the projection system 80.

The illumination system 230 is an optical system which divides light emitted from the light source lamp unit 20 into a plurality of partial lights and converts illumination light into polarized light in a specific direction, and has the first multi-lens 31, the second multi-lens 32, the polarization converting device 34, and first and second superimposing lenses 243 and 244.

The color separation and light guide system 240 includes the first and second cross dichroic mirrors 41a and 41b, the green light reflection mirror 42a, the red light reflection mirrors 42b and 42c, the blue light reflection mirror 42d, and the first, second, and third field lenses 46g, 46r, and 46b.

The first superimposing lens 243 is constituted by a third lens 243a and a fourth lens 243b. In this structure, the first superimposing lens 243 is provided for the first and third optical paths OP1 and OP3, but the third lens 243a is equipped as a common lens on the first, second, and third optical paths OP1, OP2, and OP3.

The second superimposing lens 244 is constituted by a first lens 244a and a second lens 244b. In this structure, the second superimposing lens 244 is provided for the second optical path OP2, but the first lens 244a is equivalent to the third lens 243a of the first superimposing lens 243. That is, the third lens 243a of the plural lens constituting the first superimposing lens 243 is a component contained in the second superimposing lens 244.

According to the projector 210 having this structure, images of the lens element 31a of the first multi-lens 31 are formed not on the optical paths to the liquid crystal display panels 61g and 61b but on the liquid crystal display panels 61g and 61b on the first and third optical paths OP1 and OP3. Similarly to the first optical path OP1 and the like, an image of the lens element 31a of the first multi-lens 31 is formed not on the optical path to the liquid crystal display panel 61r but on the liquid crystal display panel 61r on the second optical path OP2 longer than the first optical path OP1 and the like. Furthermore, the difference between the number of the reflection surfaces existing on the first optical path OP1 and the number of the reflection surfaces existing on the second optical path OP2 is an even number. In this case, zero is included in the even number. Thus, even in the structure where the length of the first optical path OP1 is different from the length of the second optical path OP2, the images of the lens element 31a produced by respective color lights projected by the projection system 80 after passing through these optical paths coincide with one another in the up-down and left-right directions. Moreover, since the lengths of the first optical path OP1 and the third optical path OP3 are equal with an even number difference between the number of the reflection surfaces existing on the first optical path OP1 and the number of the reflection surfaces existing on the third optical path OP3, the images of the lens element 31a of the illumination system 230 produced by the green light LG and the blue light LB passing through the first and third optical paths OP1 and OP3 and projected by the projection system 80 coincide with one another in the up-down and left-right directions with respect to the light emission side of the cross dichroic mirror 141. Thus, the images of the projected color lights LG, LR, and LB can agree with one another in the up-down and left-right directions by controlling the relative image forming conditions of the first and second optical paths OP1 and OP2 having different lengths in advance. Thus, deterioration of the white balance of light projected by the projector 210 and color unevenness of the light can be reduced even when the light emission distribution of the light source varies with elapse of time, for example. Moreover, the structures of the respective optical paths OP1, OP2, and OP3 can be simplified by providing the common first and third lenses 244a and 243a on the optical paths OP1, OP2, and OP3.

Fifth Embodiment

A projector according to a fifth embodiment of the invention is now described. The projector in the fifth embodiment is a projector produced by partially modifying the projector 10 in the first embodiment, and similar components are not particularly explained herein.

Figure 7:
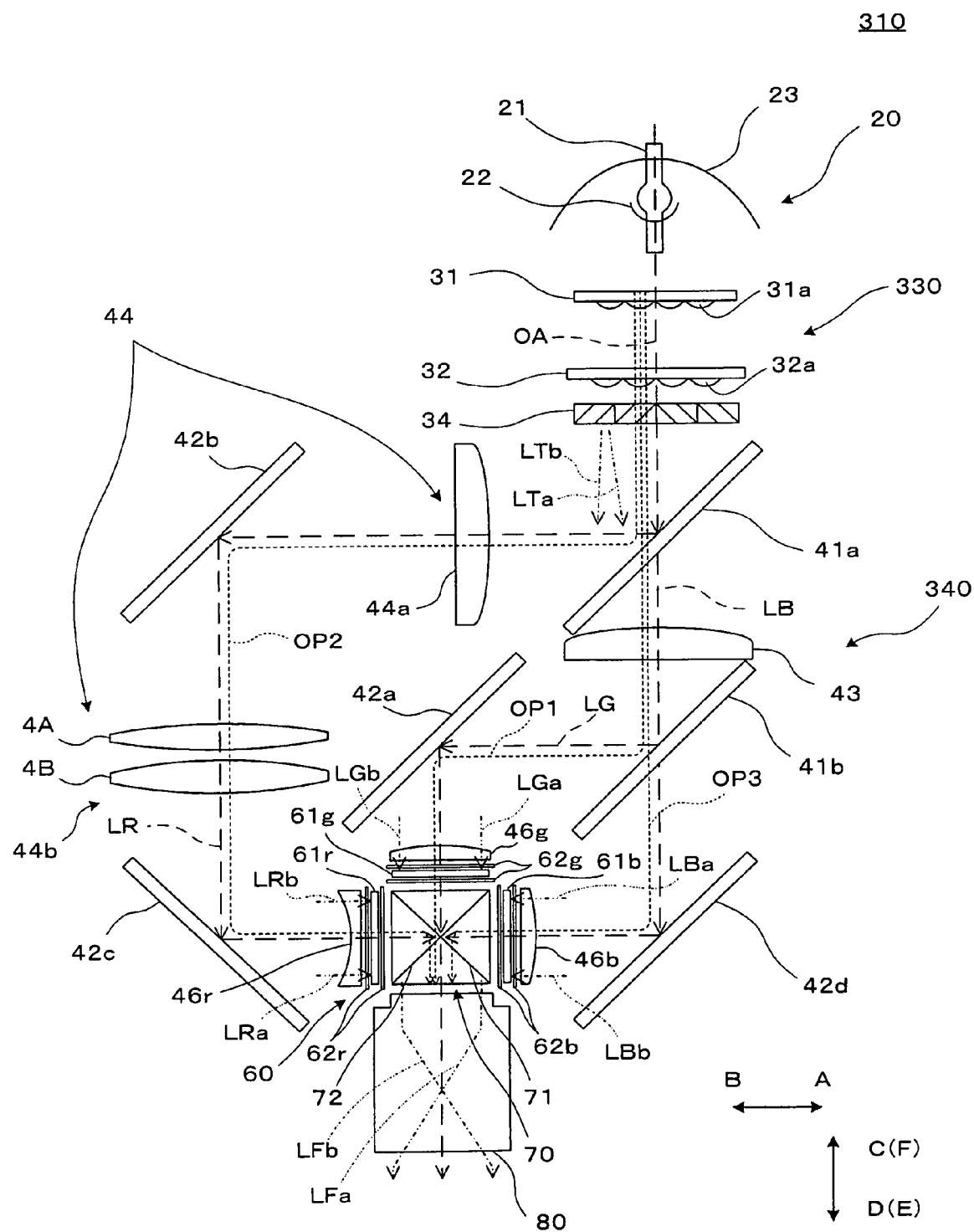
FIG. 7 illustrates a concept structure of optical systems of a projector according to a fifth embodiment.

FIG. 7 illustrates a concept of a structure of optical systems included in a projector 310 according to the fifth embodiment. The projector 310 in this embodiment includes the light source lamp unit 20, an illumination system 330, a color separation and light guide system 340, the light modulation unit 60, the cross dichroic prism 70, and the projection system 80.

The illumination system 330 is an optical system which divides light emitted from the light source lamp unit 20 into a plurality of partial lights and converts illumination light into polarized light in a specific direction, and has the first multi-lens 31, the second multi-lens 32, the polarization converting device 34, and the first and second superimposing lenses 43 and 44.

The color separation and light guide system 340 includes the first and second dichroic mirror 41a and 41b, the green light reflection mirror 42a, the red light reflection mirrors 42b and 42c, the blue light reflection mirror 42d, and the first, second, and third field lenses 46g, 46r, and 46b.

Similarly to the first embodiment, the second superimposing lens 44 is constituted by the first lens 44a and the second lens 44b. In this structure, the second lens 44b includes a front lens 4A and a rear lens 4B, and the pair of the front lens 4A and the rear lens 4B have the function corresponding to the single second lens 44b in the first embodiment. The second lens 44b constituted by the two lenses 4A and 4B has the chief function of the superimposing lens.

In the color separation and light guide system 340, the second field lens 46r is a concave lens whose power is controlled such that the received plural partial lights can enter the liquid crystal display panel 61r in the directions parallel with the respective chief rays according to the power and position of the second superimposing lens 44.

Figure 8:
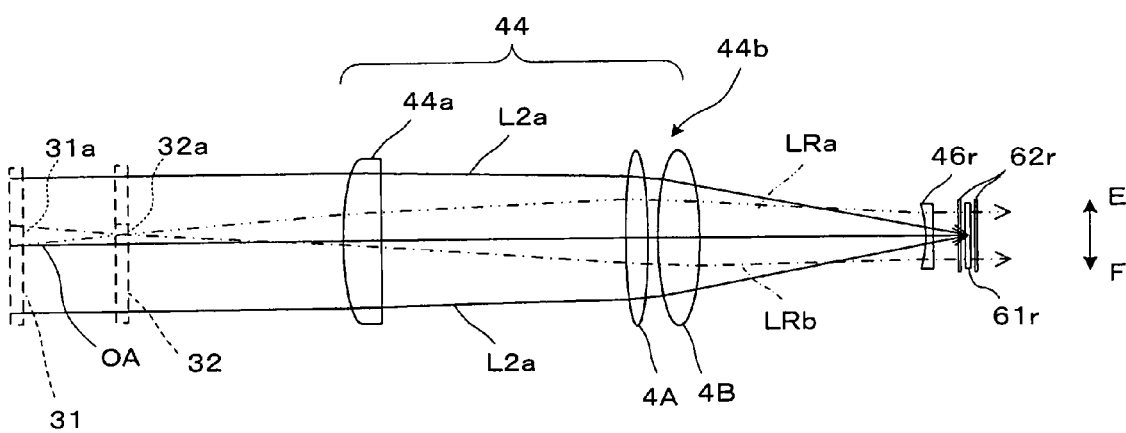
FIG. 8 illustrates condition of light on a second optical path shown in FIG. 7.

The light condition in the fifth embodiment is now discussed. FIG. 8 illustrates a condition of light along a linear optical path from which reflection by the first dichroic mirror 41a and the red light reflection mirrors 42b and 42c on the second optical path OP2 is removed in place of the second optical path OP2. That is, the figure shows a virtual condition showing a linear optical path having no reflection surface in place of the second optical path OP2. In this figure, solid lines show the condition of parallel light entering the second superimposing lens 44. Alternate long and two short dashes lines in FIGS. 2 and 3 show the condition of light emitted from the F side of the lens element 31a of the first multi-lens 31 and entering from the position of the second multi-lens 32 to the E side of the liquid crystal display panel 61r. Alternate long and short dash lines show the condition of lights emitted from the E side of the lens element 31a of the first multi-lens 31 and entering from the position of the second multi-lens 32 to the F side of the liquid crystal display panel 61r.

On the second optical path OP2, the parallel beam L2a having entered the second superimposing lens 44 passes the second field lens 46r and overlaps on the image forming area of the liquid crystal display panel 61r. Since the second lens 44b is constituted by the front lens 4A and the rear lens 4B, light is refracted by four lens surfaces. By increasing the lens surfaces in this manner, light can be sufficiently refracted by material having low refractive index. Moreover, in the structure having increased lens surfaces, each curvature of the lens surfaces can be smaller than that of the structure having a smaller number of lens surfaces. As a result, aberration can be reduced.

As illustrated in FIG. 8, the red beam LRa emitted from the F side of the lens element 31a and traveling through the lens element 32a, the first lens 44a, and the second lens 44b enters the E side of the liquid crystal display panel 61r on the second optical path OP2. The red beam LRb emitted from the E side of the lens element 31a and traveling through the lens element 32a, the first lens 44a, and the second lens 44b enters the F side of the liquid crystal display panel 61r. In this case, an inverted image of the lens element 31a constituting the first multi-lens 31 is formed at the position of the liquid crystal display panel 61r assuming that the respective beams LRa and LRa are not reflected by the first dichroic mirror 41a and the reflection mirrors 42b and 42c. Actually, a plurality of partial lights emitted from the first multi-lens 31 are reflected once by the first dichroic mirror 41b and twice by the reflection mirrors 42b and 42c that is, three times in total, on the second optical path OP2 extending from the light entrance surface of the first multi-lens 31 of the illumination system 330 through the liquid crystal display panel 61r to the light emission surface of the cross dichroic prism 70, and form an inverted image on the liquid crystal display panel 61r in the up-down and left-right directions as illustrated in FIG. 7.

According to the projector 310 having this structure, images of the lens element 31a of the first multi-lens 31 are formed not on the optical paths to the liquid crystal display panels 61g and 61b but on the liquid crystal display panels 61g and 61b on the first and third optical paths OP1 and OP3. Similarly to the first optical path OP1 and the like, an image of the lens element 31a of the first multi-lens 31 is formed not on the optical path to the liquid crystal display panel 61r but on the liquid crystal display panel 61r on the second optical path OP2 longer than the first optical path OP1 and the like. Furthermore, the difference between the number of the reflection surfaces existing on the first optical path OP1 and the number of the reflection surfaces existing on the second optical path OP2 is an even number. Thus, even in the structure where the length of the first optical path OP1 is different from the length of the second optical path OP2, the images of the lens element 31a produced by respective color lights projected from the projection system 80 after passing through these optical paths coincide with one another in the up-down and left-right directions. Moreover, since the lengths of the first optical path OP1 and the third optical path OP3 are equal with an even number difference between the number of the reflection surfaces existing on the first optical path OP1 and the number of the reflection surfaces existing on the third optical path OP3, the images of the lens element 31a of the illumination system 330 produced by the green light LG and the blue light LB passing through the first and third optical paths OP1 and OP3 and projected by the projection system 80 coincide with one another in the up-down and left-right directions with respect to the light emission side of the cross dichroic mirror 141. Thus, the images of the projected color lights LG, LR, and LB can agree with one another in the up-down and left-right directions by controlling the relative image forming conditions on the first, second, and third optical paths OP1, OP2, and OP3 having different lengths in advance. Thus, deterioration of the white balance of light projected by the projector 310 and color unevenness of the light can be reduced even when the light emission distribution of the light source varies with, elapse of time, for example.

Moreover, the whole second lens 44b can function as a highly accurate lens by providing the front lens 4A and the rear lens 4B as the second lens 44b even when the two lenses 4A and 4B are ordinary lenses.

Sixth Embodiment

A projector according to a sixth embodiment of the invention is now described. The projector 410 in the sixth embodiment is a projector produced by partially modifying the projectors 10, 310 in the first and fifth embodiments, and similar components are not particularly explained herein.

Figure 9:
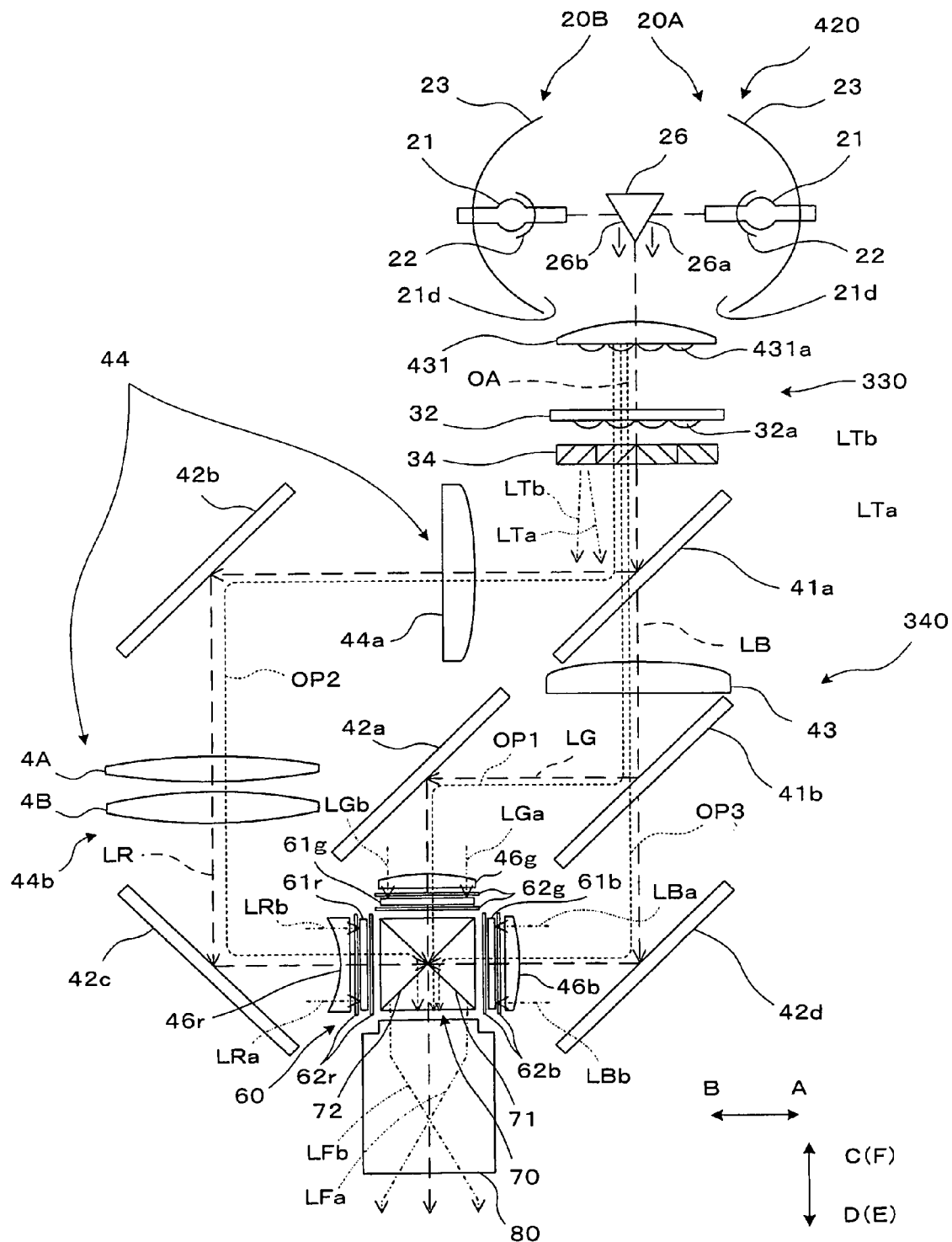
FIG. 9 illustrates a concept structure of optical systems of a projector according to a sixth embodiment.

FIG. 9 illustrates a concept of a structure of optical systems included in a projector 410 according to the sixth embodiment. The projector 410 in this embodiment includes a light source lamp unit 420, the illumination system 330, the color separation and light guide system 340, the light modulation unit 60, the cross dichroic prism 70, and the projection system 80.

The light source lamp unit 420 has two light source lamps 20A and 20B, and a reflection prism 26. The reflection prism 26 constitutes a combining system which combines lights emitted from the light source.

The two light source lamps 20A and 20B have the same structure containing the lamp main body 21, the sub mirror 22, and the main mirror 23. The two light source lamps 20A and 20B are disposed opposed to each other with the system optical axis OA interposed therebetween along the flat plane parallel with the sheet surface along which the color separation and light guide system 340 extends. In this arrangement, a light emission opening 21d of the light source lamps 20A and 20B is disposed in such a condition that the light source lamps 20A and 20B are opposed to each other with respect to the system optical axis OA in the vertical direction. Light emitted from the light source lamps 20A and 20B toward the front is bended and overlapped by the corresponding reflection surfaces 26a and 26b of the reflection prism 26 while converged.

The positions of the two light source lamps 20A and 20B are not limited to those shown in this embodiment, but may be any positions as long as the light after combination is overlapped substantially with uniformity and supplied to the subsequent illumination system 330.

The reflection prism 26 has function of combining lights emitted from the light source lamps 20A and 20B by the single body. The reflection prism 26 can combine the lights emitted from the lamp main bodies 21 toward positions close to each other by bending the light at the adjacent reflection surfaces 26a and 26b as shown in FIG. 9. The reflection surfaces 26a and 26b of the reflection prism 26 have aluminum films or dielectric multilayer films deposited thereon so as to efficiently reflect visible light.

The illumination system 330 is an optical system which divides light emitted from the light source lamp unit 420 into a plurality of partial lights, and converts illumination light into polarized light in a specific direction. The illumination system 330 has a first multi-lens 431, the second multi-lens 32, the polarization converting device 34, and the first and second superimposing lenses 43 and 44.

The first multi-lens 431 has a convex surface on the light entrance side, and supplies diverged light emitted from the reflection prism 26 to lens elements 431a constituting the first multi-lens 431 in a collimated condition.

According to the projector 410 having this structure, images of the lens element 31a of the first multi-lens 31 are formed not on the optical paths to the liquid crystal display panels 61g and 61b but on the liquid crystal display panels 61g and 61b on the first and third optical paths OP1 and OP3. Similarly to the first optical path OP1 and the like, an image of the lens element 31a of the first multi-lens 31 is formed not on the optical path to the liquid crystal display panel 61r but on the liquid crystal display panel 61r on the second optical path OP2 longer than the first optical path OP1 and the like. Furthermore, the difference between the number of the reflection surfaces existing on the first optical path OP1 and the number of the reflection surfaces existing on the second optical path OP2 is an even number. Thus, even in the structure where the length of the first optical path OP1 is different from the length of the second optical path OP2, the images of the lens element 31a produced by respective color lights projected from the projection system 80 after passing through these optical paths coincide with one another in the up-down and left-right directions. Moreover, since the lengths of the first optical path OP1 and the third optical path OP3 are equal with an even number difference between the number of the reflection surfaces existing on the first optical path OP1 and the number of the reflection surfaces existing on the third optical path OP3, the images of the lens element 31a of the illumination system 330 produced by the green light LG and the blue light LB passing through the first and third optical paths OP1 and OP3 and projected by the projection system 80 coincide with one another in the up-down and left-right directions.

When the plural light source lamp units 20 are used, illumination light having no symmetric illuminance around the system optical axis in the up-down and left-right directions but locally collapsed symmetrical illuminance distribution is easily applied to the liquid crystal display panels 61g, 61r, and 61b due to effects such as component difference and position shift of the light source lamps 20A and 20B and shape and position of the reflection prism 26. In this embodiment, however, the positional relationship between the images of the projected color lights LG, LR, and LB is equalized in the up-down and left-right directions by controlling the relative image-forming conditions of the first, second, and third optical paths OP1, OP2, and OP3 having different lengths in advance. Thus, color unevenness of the projected images can be reduced.

When the amount of light from either one of the plural light source lamps 20A and 20B is decreased with elapse of time, inclination of the illuminance distribution on the first multi-lens 31 is produced. As a result, illumination light which has illuminance distribution having locally collapsed symmetry is easily supplied to the liquid crystal display panels 61g, 61r, and 61b. In this embodiment, however, the positional relationship between the images of the projected color lights LG, LR, and LB is equalized in the up-down and left-right directions by controlling relative image-forming conditions of the first, second, and third optical paths OP1, OP2, and OP3 having different lengths in advance. Thus, the phenomenon that color unevenness of the projected images increases with elapse of time can be securely reduced.

While the case in which the amount of lights from the light source lamps 20A and 20B varies with elapse of time has been discussed, deterioration of white balance of projected light from the projector 410 and color unevenness of the light can be reduced when the symmetry of the distribution of illumination light collapses due to fault of lighting of one of the two light source lamps 20A and 20B.

As discussed, in the structure where only one of the light source lamps 20A and 20B is turned on, color unevenness can be reduced. Thus, accurate alignment of the two light source lamps 20A and 20B with respect to the reflection prism 26 is not necessary in the light source lamp unit 420. Thus, the projector 410 can be easily manufactured.

The invention is not limited to the embodiments described herein, but may be practiced otherwise without departing from the scope of the invention. For example, the following modifications may be made.

While the green light LG, red light LR, and blue light LB are directed to the first optical path OP1, the second optical path OP2, and the third optical path OP3, respectively, these combinations may be freely varied by changing the design of the first and second dichroic mirrors 41*a* and 41*b* and the like as the color separation and light guide system. For example, the blue light LB and the green light LG can be guided to the long third optical path OP3 in the first embodiment. It is preferable, however, that the green light LG is directed to the first optical path OP1 for increasing the illumination intensity of the projected image.

In the embodiments, the projector includes the three optical paths of the first through third optical paths OP1 through OP3. However, a projector including the two optical paths of the first optical path OP1 and the second optical path OP2 longer than the first optical path OP1 may be employed similarly to the embodiments. In this case, the positional relationship between the images of the respective color lights projected by the projector is equalized in the up-down and left-right directions by controlling the relative image-forming condition and the reflection number of the first and second optical paths OP1 and OP2 having different lengths in advance so as to reduce deterioration of white balance and color unevenness of the light projected by the projector. Furthermore, a projector including four or more optical paths having different optical paths can reduce deterioration of white balance and color unevenness of light projected by the projector in the same manner as in the above embodiments.

While the cross dichroic prism 70 has been used for combining illumination light in the embodiments, a cross dichroic mirror may be used as another example of the light combining system. While the cross dichroic mirror 141 has been used for dividing illumination light in the third embodiment, a cross dichroic prism may be used in lieu of the cross dichroic mirror 141.

The projector 10 and the like according to the embodiments include the high-pressure mercury lamp or the like as the lamp main body 21 of the light source lamp unit 20 since the high-pressure mercury lamp can emit high-luminance light throughout the wavelengths of the respective color lights. However, various types of lamp for emitting approximately white illumination light and solid light emission elements such as LED may be used. The main mirror 23 is not limited to the structure having the ellipsoidal surface but may be various types of reflector having parabolic surface and the like. When the main mirror 23 having the parabolic surface is used, collimated light can be emitted from the light source lamp unit 20 without providing the concave lens 24 and the like downstream from the main mirror 23.

While the projector 10 and the like according to the embodiments have the illumination systems 30, 130, 230, and 330 constituted by the first and second multi-lenses 31 and 32 and the polarization converting device 34, the first and second multi-lenses 31 and 32 and the like may be removed or replaced with rod integrator. In this case, the light dividing optical element corresponds to the rod integrator, and the optical system for producing an inverted image formed on the light emission surface of the rod integrator (inverted image of illumination system) on the light modulation device corresponds to the superimposing system.

According to the invention, the positions of the first superimposing lens 43, the second superimposing lens 44, and the like may be positions for illuminating the light receiving area of the light modulation unit 60, that is, the image forming areas of the liquid crystal display panels 61*g*, 61*r*, and 61*b* approximately uniformly after overlapping the illumination light.

The invention is applicable to a front projection type projector which projects projection images from the image viewing side, and to a rear projection type projector which projects projection images on the side opposite to the image viewing side.

In the fifth embodiment, the lenses of the first, second, and third superimposing lenses 43, 44, and 45 may be constituted by a common lens.

The invention claimed is:

1. A projector, comprising:
a light source which emits light containing a first color light and a second color light;
an illumination system which equalizes light emitted from the light source;
a color separation and light guide system which separates light emitted from the light source into the first color light and the second color light;
a light modulation unit which has a first light modulation device and a second light modulation device illuminated by the first color light and the second color light, respectively, separated by the color separation and light guide system; and
a light combining system which combines the first color light and the second color light passing through the first light modulation device and the second light modulation device and received through a plurality of light receiving portions to emit the combined light from a light emission portion,
a length of a first optical path for directing the first color light traveling from the illumination system through the first light modulation device to the light emission portion of the light combining system being shorter than a length of a second optical path for directing the second color light traveling from the illumination system through the second light modulation device to the light emission portion of the light combining system,
the color separation and light guide system having at least one reflection surface,
a difference between the number of reflections of the first color light on the first optical path and the number of reflections of the second color light on the second optical path being an even number,
an inverted image of the illumination system being formed at the position of the first light modulation device without image formation at an intermediate position between the illumination system and the first light modulation device when the first optical path is replaced with a linear optical path having no reflections, and
an inverted image of the illumination system being formed at the position of the second light modulation device without image formation at an intermediate position between the illumination system and the second light modulation device when the second optical path is replaced with a linear optical path having no reflections.

2. The projector according to claim 1, wherein:
the light source emits light containing a third color light;
the color separation and light guide system divides light emitted from the light source into the first color light, the second color light, and the third color light;
the light modulation unit further has a third light modulation device illuminated by the third color light separated by the color separation and light guide system;
the light combining system is a cross dichroic prism;
the cross dichroic prism combines the first color light, the second color light, and the third color light passing through the first light modulation device, the second light modulation device, and the third light modulation device and received through a plurality of light receiving surfaces corresponding to the plural light receiving portions, and to emit the combined light through a light emission surface corresponding to the light emission portion;

a length of a third optical path for directing the third color light traveling from the illumination system through the third light modulation device to the light emission surface corresponding to the light emission portion of the cross dichroic prism is equal to the length of the first optical path;

a difference between the number of reflections of the first color light on the first optical path and the number of reflections of the third color light on the third optical path being an even number; and an inverted image of the illumination system is formed at the position of the third light modulation device without image formation at an intermediate position between the illumination system and the third light modulation device when the third optical path is replaced with a linear optical path having no reflections.

3. The projector according to claim 2, wherein:

the illumination system has a light dividing optical element which divides light emitted from the light source into a plurality of partial lights, and a superimposing system which overlaps the plural partial lights on the first light modulation device, the second light modulation device, and the third light modulation device;

the superimposing system has a first superimposing lens which overlaps the plural partial lights of the first color light contained in the plural partial lights on the first light modulation device and overlaps the plural partial lights of the third color light contained in the plural partial lights on the third light modulation device, and a second superimposing lens which overlaps the plural partial lights of the second color light contained in the plural partial lights on the second light modulation device;

the first superimposing lens is disposed in the area of the first optical path overlapping with the third optical path and not overlapping with the second optical path; and the second superimposing lens is disposed in the area of the second optical path not overlapping with the first optical path and the third optical path.

4. The projector according to claim 3, wherein at least either the first superimposing lens or the second superimposing lens includes a plurality of lenses.

5. The projector according to claim 4, wherein the illumination system further includes an optical element which is disposed between the light dividing element and the superimposing system to converge the plural partial lights divided by the light dividing optical element.

6. The projector according to claim 4, wherein the light source has a plurality of light emission sources.

7. The projector according to claim 1, wherein:

the light source emits light containing third color light;

the color separation and light guide system separates light emitted from the light source into the first color light, the second color light, and the third color light;

the light modulation unit further has a third light modulation device illuminated by the third color light separated by the color separation and light guide system;

the light combining system is a cross dichroic prism;

the cross dichroic prism combines the first color light, the second color light, and the third color light passing through the first light modulation device, the second light modulation device, and the third light modulation device and received through a plurality of light receiving surfaces corresponding to the plural light receiving portions, and to emit the combined light through a light emission surface corresponding to the light emission portion;

a length of a third optical path for directing the third color light traveling from the illumination system through the third light modulation device to the light emission surface corresponding to the light emission portion of the cross dichroic prism is equal to the length of the second optical path;

a difference between the number of reflections of the second color light on the second optical path and the number of reflections of the third color light on the third optical path is an even number; and an inverted image of the illumination system is formed at the position of the third light modulation device without image formation at an intermediate position between the illumination system and the third light modulation device when the third optical path is replaced with a linear optical path having no reflection.

8. The projector according to claim 7, wherein:

the illumination system has a light dividing optical element which divides light emitted from the light source into a plurality of partial lights, and a superimposing system which overlaps the plural partial lights on the first light modulation device, the second light modulation device, and the third light modulation device;

the superimposing system has a first superimposing lens which overlaps the plural partial lights of the first color light contained in the plural partial lights on the first light modulation device, a second superimposing lens which overlaps the plural partial lights of the second color light contained in the plural partial lights on the second light modulation device, and a third superimposing lens which overlaps the plural partial lights of the third color light contained in the plural partial lights on the third light modulation device;

the second superimposing lens includes a plurality of lenses; and the third superimposing lens includes a plurality of lenses.

9. The projector according to claim 1, wherein the illumination system has a light dividing optical element which divides light emitted from the light source into a plurality of partial lights, and a superimposing system which overlaps the plural partial lights on the first light modulation device and the second light modulation device;

the superimposing system has a first superimposing lens which overlaps the plural partial lights of the first color light contained in the plural partial lights on the first light modulation device, and a second superimposing lens which overlaps the plural partial lights of the second color light contained in the plural partial lights on the second light modulation device;

the first superimposing lens is disposed in the area of the first optical path not overlapping with the second optical path; and the second superimposing lens is disposed in the area of the second optical path not overlapping with the first optical path.

10. The projector according to claim 9, wherein at least either the first superimposing lens or the second superimposing lens includes a plurality of lenses.

11. The projector according to claim 10, wherein the illumination system further includes an optical element which is disposed between the light dividing element and the superimposing system to converge the plural partial lights divided by the light dividing optical element.

12. The projector according to claim 10, wherein the light source has a plurality of light emission sources.

13. The projector according to claim 1, wherein:
the illumination system has a light dividing optical element which divides light emitted from the light source into a plurality of partial lights, and a superimposing system which overlaps the plural partial lights on the first light modulation device and the second light modulation device;
the superimposing system has a first superimposing lens which overlaps the plural partial lights of the first color light contained in the plural partial lights on the first light modulation device, and a second superimposing lens which overlaps the plural partial lights of the second color light contained in the plural partial lights on the second light modulation device;
the first superimposing lens includes a plurality of lenses;
the second superimposing lens includes a plurality of lenses;
at least one of lenses included in the first superimposing lens is a common lens included in the second superimposing lens; and
the common lens is disposed before light emitted from the light source is separated into the respective color lights by the color separation and light guide system.

14. The projector according to claim 1, wherein the light source has a plurality of light emission sources.

15. A projector, comprising:
a light source which emits light containing first color light and second color light;
a light dividing optical element which divides light emitted from the light source into a plurality of partial lights;
a color separation and light guide system which separates light emitted from the light dividing optical element into the first color light and the second color light;
a light modulation unit which has a first light modulation device and a second light modulation device illuminated by the first color light and the second color light, respectively, separated by the color separation and light guide system;
a cross dichroic prism which combines the first color light and the second color light passing through the first light modulation device and the second light modulation device and received through a plurality of light receiving portions to emits the combined light from a light emission surface; and
a superimposing system which overlaps the plural partial lights on the first light modulation device and the second light modulation device,
a length of a first optical path for directing the first color light traveling from the light dividing optical element through the first light modulation device to the light emission surface of the cross dichroic prism being shorter than a length of a second optical path for directing the second color light traveling from the light dividing optical element through the second light modulation device to the light emission surface of the cross dichroic prism,
the color separation and light guide system having at least one reflection surface,
a difference between the number of reflections of the first color light on the first optical path and the number of reflections of the second color light on the second optical path being an even number,
an inverted image of the light dividing element being formed at the position of the first light modulation device without image formation at an intermediate position between the illumination system and the first light modulation device when the first optical path is replaced with a linear optical path having no reflections, and
an inverted image of the light dividing element being formed at the position of the second light modulation device without image formation at an intermediate position between the illumination system and the second light modulation device when the second optical path is replaced with a linear optical path having no reflections.

16. The projector according to claim 15, wherein the light source has a plurality of light emission sources.

17. The projector according to claim 15, wherein:
the light source emits light containing third color light;
the color separation and light guide system separates light emitted from the light source into the first color light, the second color light, and the third color light;
the light modulation unit further has a third light modulation device illuminated by the third color light separated by the color separation and light guide system;
the superimposing system has a first superimposing lens which overlaps the plural partial lights of the first color light contained in the plural partial lights on the first light modulation device and overlaps the plural partial lights of the third color light contained in the plural partial lights on the third light modulation device, and a second superimposing lens which overlaps the plural partial lights of the second color light contained in the plural partial lights on the second light modulation device;
the first superimposing lens is disposed in the area of the first optical path overlapping with the third optical path and not overlapping with the second optical path; and
the second superimposing lens is disposed in the area of the second optical path not overlapping with the first optical path and the third optical path.

18. The projector according to claim 17, wherein at least either the first superimposing lens or the second superimposing lens includes a plurality of lenses.

19. The projector according to claim 18, further comprising an optical element which is disposed between the light dividing element and the superimposing system to converge the plural partial lights divided by the light dividing optical element.

20. The projector according to claim 18, wherein the light source has a plurality of light emission sources.

* * * * *